US009774930B2

(12) United States Patent
Chu et al.

(10) Patent No.: US 9,774,930 B2
(45) Date of Patent: Sep. 26, 2017

(54) OPTICAL DEVICE AND METHODS

(71) Applicant: CAMBRIDGE ENTERPRISE LIMITED, Cambridge (GB)

(72) Inventors: Daping Chu, Cambridge (GB); Neil Collings, Cambridge (GB); John Richard Moore, Barton (GB); Mykhaylo Pivnenko, Cambridge (GB); Brian Robertson, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 407 days.

(21) Appl. No.: 14/374,628

(22) PCT Filed: Jan. 23, 2013

(86) PCT No.: PCT/GB2013/050142
§ 371 (c)(1),
(2) Date: Jul. 25, 2014

(87) PCT Pub. No.: WO2013/117903
PCT Pub. Date: Aug. 15, 2013

(65) Prior Publication Data
US 2014/0363162 A1    Dec. 11, 2014

(30) Foreign Application Priority Data
Jan. 25, 2012    (GB) .................... 1201190.4

(51) Int. Cl.
*G02F 1/07*    (2006.01)
*G02F 1/03*    (2006.01)
(Continued)

(52) U.S. Cl.
CPC .......... *H04Q 11/0005* (2013.01); *B82Y 20/00* (2013.01); *G02F 1/03* (2013.01);
(Continued)

(58) Field of Classification Search
CPC .... G02B 5/32; G02B 5/1861; G02B 27/0172; G02B 27/0944; G02B 5/1828; G02B 27/0927; G02B 5/203
(Continued)

(56) References Cited

U.S. PATENT DOCUMENTS

| 4,767,194 A | 8/1988 | Heppke et al. |
| 5,319,492 A | 6/1994 | Dorn et al. |

(Continued)

FOREIGN PATENT DOCUMENTS

| EP | 1688783 A1 | 8/2006 |
| GB | 2430048 A | 3/2007 |

(Continued)

OTHER PUBLICATIONS

Filippini, et al., "Nematogenic Liquids: A New Class of Materials for Kerr Cells", "J. Phys. D; Appl. Phys.", 1975, pp. L152-L154, vol. 8, No. 12, Published in: UK.

(Continued)

*Primary Examiner* — Evelyn A Lester
(74) *Attorney, Agent, or Firm* — Loginov & Associates; William A. Loginov

(57) ABSTRACT

We describe methods and devices for manipulating optical signals. A method of manipulating an optical signal comprises providing a device (100) comprising a layer (106) of blue phase liquid crystal in the path of the optical signal; and applying a dynamically varying spatial pattern of voltages across the layer (106) of blue phase liquid crystal, thereby causing the refractive index of the layer (106) of blue phase liquid crystal to vary according the dynamically varying spatial pattern.

14 Claims, 17 Drawing Sheets

(51) Int. Cl.

| | |
|---|---|
| *G02B 5/18* | (2006.01) |
| *H04Q 11/00* | (2006.01) |
| *B82Y 20/00* | (2011.01) |
| *G02F 1/29* | (2006.01) |
| *H04J 14/02* | (2006.01) |
| *G02B 27/01* | (2006.01) |
| *G02B 27/09* | (2006.01) |
| *G02B 5/32* | (2006.01) |
| *G02B 5/20* | (2006.01) |
| *G02F 1/1362* | (2006.01) |
| *G02B 1/11* | (2015.01) |
| *G02F 1/137* | (2006.01) |

(52) U.S. Cl.
CPC .............. *G02F 1/0338* (2013.01); *G02F 1/07* (2013.01); *G02F 1/292* (2013.01); *G02F 1/293* (2013.01); *H04J 14/0221* (2013.01); *G02B 1/11* (2013.01); *G02B 5/1828* (2013.01); *G02B 5/1861* (2013.01); *G02B 5/203* (2013.01); *G02B 5/32* (2013.01); *G02B 27/0172* (2013.01); *G02B 27/0927* (2013.01); *G02B 27/0944* (2013.01); *G02F 1/136277* (2013.01); *G02F 2001/13793* (2013.01); *G02F 2203/06* (2013.01); *H04Q 2011/0016* (2013.01); *H04Q 2011/0035* (2013.01)

(58) Field of Classification Search
USPC ...... 359/10, 11, 15, 251, 254, 255, 572, 573
See application file for complete search history.

(56) References Cited

U.S. PATENT DOCUMENTS

| | | |
|---|---|---|
| 7,542,197 B2 | 6/2009 | Ishii et al. |
| 7,664,395 B2 | 2/2010 | Holmes |
| 2007/0080370 A1 | 4/2007 | Miyachi et al. |
| 2012/0057235 A1 | 3/2012 | Chang et al. |

FOREIGN PATENT DOCUMENTS

| | | | |
|---|---|---|---|
| JP | 2002010368 | A | 2/2002 |
| JP | 2002357802 | A | 12/2002 |
| JP | 2006243760 | A | 9/2006 |
| JP | 2007510957 | A | 4/2007 |
| JP | 2010244068 | A | 10/2010 |
| WO | WO 2005047942 | A1 | 5/2005 |
| WO | 2005052674 | A1 | 6/2005 |
| WO | 2012123713 | A2 | 9/2012 |

OTHER PUBLICATIONS

Lin, et al., "Polarization-Independent and High-Diffraction-Efficiency Fresnel Lenses Based on Blue Phase Liquid Crystals", "Optics Letters", Feb. 15, 2011, pp. 502-504, vol. 36, No. 4, Publisher: Optical Society of America, Published in: US.

Den Boer, "AMLCD Electronics", "Active Matrix Liquid Crystal Displays: Fundamentals and Applications", Jan. 1, 2005, pp. 87-113, Publisher: Elsevier, Published in: US.

(a)

Dielectric stack - multiple λ/4 layers of different indices (b)

Graded chamge in refractive index (c)

Patterned nano-structure with period of pattern < λ

Structured surface        Equivelant effective medium model

OPTICAL DEVICE AND METHODS

FIELD OF THE INVENTION

Embodiments of the present invention relate to methods and apparatus for modifying the phase of a beam of light for example for routing and/or switching beams of light and adaptive optics. In particular, embodiments of the present invention relate to polarisation insensitive phase modification of beams of light.

BACKGROUND

Phase modulation of coherent light allows high-efficiency holographic image projection and beam steering; the latter applications include Optically Transparent Switches for optical networks, for Add-Drop Multiplexers for Wavelength Division Multiplexing (WDM) Telecomms, and TV multicast. Incident illumination from the incoming fibres can be randomly or variably polarised or polarisation multiplexed, and the overall rotation of polarisation of the original signal into the fibre may vary with time or day, temperature, mechanical stress on the fibre, etc. To deflect and route these signals without unacceptable losses or continuous adjustment polarisation insensitive methods are needed.

One method of routing signals uses a Spatial Light Modulator (SLM) which instead of modulating luminance modulates the phase of the reflected light in the relative range 0 to $2\pi$, and presents blazed gratings or suitable holograms to steer the incoming signals to different output ports, e.g. using a Liquid-Crystal-on-Silicon (LCOS) backplane to display the phase hologram. The Liquid Crystal (LC) material may be a nematic material, generating an analogue blazed grating (in which case only a single linearly polarised component of the signal is modulated), or a suitable ferroelectric LC which can be polarisation insensitive but has the disadvantage that only binary phase gratings or holograms can be formed, resulting in an extra 3 dB routing loss. Background prior art can be found in U.S. Pat. No. 5,319,492 and JP2002/357802A.

In general it is desirable to suppress unwanted reflections in such devices; for some applications such as telecoms this is particularly important to suppress unwanted crosstalk. Background prior art relating to anti-reflection structures can be found in: U.S. Pat. No. 7,542,197; GB2,430,048A; US2012/0057235; and WO2012/123713.

Random polarisation can be accommodated by splitting the incoming signal into two orthogonal polarisation streams, routing each separately using suitably oriented nematic SLMs, and recombining them (with additional losses and a requirement for careful path length balancing), or by using a technique such as an internal quarter-wave plate.

Light travelling through a medium can be disrupted by variations in refractive index—e.g. in the atmosphere due to turbulence giving pressure changes or convection caused by temperature changes. For any object viewed in the far field, this alters the shape of the plane wave across the entry optics, and limits the resolution of the optics below the theoretical limit. E.g. for an astronomical telescope this gives a blurred jittering image of a star which should be a point source. For planetary or surveillance images this also gives instantaneous spatial distortion.

Adaptive optics can partially compensate for the disturbance, usually by using a deformable mirror with an array of electro-mechanical actuators. These can correct the wavefront deformation of a few microns and partially restore the wavefront.

SUMMARY OF INVENTION

According to a first aspect of the present invention, there is provided an optical routing device comprising a substrate; a plurality of reflective pixel electrodes disposed on the substrate; a transparent layer comprising at least one counter electrode; and a variable refractive index layer disposed between the plurality of transparent pixel electrodes and the transparent layer. The variable refractive index layer comprises a material having a first, isotropic refractive index under no applied electric field and a second, different refractive index under an applied electric field wherein the second, different refractive index is isotropic perpendicular to the direction of the applied electric field.

Embodiments of the present invention may be used to switch an optical signal between different outputs by applying spatial patterns of voltages between the pixel electrodes and the counter electrode. The different spatial patterns of voltages cause the variable refractive index layer to provide different diffraction gratings. The diffraction gratings may be configured to direct the input signal to different output channels or fibres.

Embodiments of the present invention have the advantage that since the refractive index of the variable refractive index layer is isotropic perpendicular to the direction of the applied electric field and because the applied electric field is applied substantially in the direction that the input signal is incident on the device, the routing device is polarisation independent.

In embodiments of the present invention, the transparent layer comprises a plurality of counter electrodes.

In embodiments of the present invention the pixel electrodes are arranged in rows and the plurality of counter electrodes each oppose a row of pixel electrodes. The pixel electrodes may be substantially rectangular and have a smaller dimension along the axis of the rows than perpendicular to the axis of the rows.

According to an embodiment of the present invention, the variable refractive index layer comprises a blue phase liquid crystal material.

According to a second aspect of the present invention, there is provided an optical telecommunications polarisation-insensitive beam switching/routing device. The device comprises: a backplane comprising drive electronics configured to drive a plurality of optically reflective pixel electrodes for pixels of the device; a transparent layer bearing at least one transparent counter-electrode; and a layer of adjustable refractive index material between said counter-electrode and said pixel electrodes. The material has a first, isotropic refractive index, n, under no applied electric field and wherein under an applied electric field said material has a second, different refractive index, n', wherein said second, different refractive index is isotropic perpendicular to a direction of said applied electric field.

According to an embodiment of the present invention the material is a non-liquid crystal material. An example of such a material is nitrobenzene.

According to an embodiment of the present invention the material is a blue-phase liquid crystal material and said backplane is an LCOS (liquid crystal on silicon) backplane.

The liquid crystal material may have an optical Kerr constant of greater than 5 nm/V$^2$.

According to an embodiment of the present invention, the device comprises means to apply an ac bias voltage to one or both of said counter electrode and a set of said pixel electrodes. In an embodiment the ac bias voltage is at least 20V peak-to-peak.

In an embodiment the LCOS backplane incorporates a temperature sensitive element, the device further comprising a temperature control system coupled to said temperature sensing element to control the temperature of said material.

According to an embodiment of the present invention, the counter electrode is segmented into rows.

According to a third aspect of the present invention, there is provided a method of routing an optical signal. The method comprises providing a routing device comprising a layer of blue phase liquid crystal between a plurality of pixel electrodes and at least one counter electrode; applying a first spatial pattern of voltages between the pixel electrodes and the counter electrode such that the refractive index of the layer of blue phase liquid crystal varies spatially to provide a first diffraction grating that deflects the optical signal to a first output; and applying a second spatial pattern of voltages between the pixel electrodes and the counter electrode such that the refractive index of the layer of blue phase liquid crystal varies spatially to provide a second diffraction grating that deflects the optical signal to a second output, thereby switching the optical signal from the first output to the second output.

Embodiments of the invention allow polarisation independent routing with devices as described above.

In an embodiment, the method comprises applying a square wave alternating voltage to the at least one counter electrode; and applying a spatial pattern of drive voltages to the pixel electrodes, wherein the spatial pattern of drive voltages has a transition from a first set of drive voltages to a second set of drive voltages which coincides with a transition of the square wave alternating voltage and an instantaneous level of the square wave alternating voltage, at a first time, and said first set of drive voltages provide the first spatial pattern of voltages and an instantaneous level of the square wave alternating voltage, at a second time, and said second set of drive voltages provide the second spatial pattern of voltages.

In an embodiment applying a first spatial pattern of voltages between the pixel electrodes and the counter electrode comprises applying a first drive signal to the pixel electrodes and applying a second spatial pattern of voltages between the pixel electrodes and the counter electrode comprises applying a second drive signal to the pixel electrodes.

In an embodiment, the method further comprises applying an offset signal to the counter electrode. In an embodiment, the first drive signal and the second drive signals comprise a variable amplitude square wave.

In an embodiment, the method, further comprises applying a square wave alternating voltage to the counter electrode.

It has been observed that the refractive index certain of variable refractive index materials depends on the square of the voltage. By applying a voltage to both the counter electrode and the pixel electrodes and by timing the transitions of the voltages on the counter electrode with the transitions from the first drive signal to the second drive signal, the voltage applied across the variable refractive index material can be increased and the change in refractive index for a given change in pixel voltage can be maximised.

According to a fourth aspect of the present invention, there is provided a method of polarisation-insensitive switching or routing of one or more optical telecommunications signal beams. The method comprises: providing a reflective liquid crystal on silicon backplane having a plurality of pixels with a layer of blue-phase liquid crystal material over said backplane and a counter-electrode over said blue-phase liquid crystal material; and displaying at least one diffractive optical element by applying a patterned electric field to said blue-phase liquid crystal material, wherein said electric field runs between said pixels of said backplane and said counter electrode and substantially parallel to light incident onto and reflected from said reflective LCOS backplane; and deflecting a said signal beam using said refractive optical element.

In an embodiment the diffractive optical element is configured to deflect a said signal beam in two dimensions.

In an embodiment said diffractive optical element comprises a hologram, the method comprising switching or routing a plurality of said signal beams simultaneously using said hologram.

In an embodiment the signal beam comprises a wavelength division multiplex (WDM) signal beam, the method further comprising de-multiplexing said WDM signal beam into a plurality of separate wavelength signal beams, wherein said de-multiplexing retains components of two orthogonal polarising components in a said separate wavelength signal beam; directing said separate wavelength signal beams to different spatial regions of said diffractive optical element; deflecting said separate wavelength beams; and re-multiplexing at least some of said deflected separate wavelength beams.

In an embodiment said modulating using said electric field comprises applying a voltage of less than 25V between a pixel electrode of said LCOS backplane and said counter-electrode.

According to a fifth aspect of the present invention, there is provided a method of manipulating an optical signal. The method comprises providing a device comprising a layer of blue phase liquid crystal material in the path of the optical signal. By applying dynamically varying spatial pattern of voltages to the layer of blue phase liquid crystal material, the refractive index of the layer is caused to vary spatially according to the applied pattern.

In an embodiment, the optical signal is incident on the layer of blue phase liquid crystal at an angle of less than 5 degrees to normal. The inventors of the present invention have demonstrated that at angles of less than 5 degrees to normal, polarisation independent manipulation can be achieved with a variation in polarisation of less than $\lambda/8$.

The voltages applied to the blue phase liquid crystal material may be greater than 50 volts and preferably greater than 100 volts.

In an embodiment the device comprises a plurality of electrodes disposed on one side of the layer of blue phase liquid crystal material the dynamically varying spatial pattern of voltages is applied to the plurality of electrodes.

In an embodiment the device comprises a photoconductive layer and applying the dynamically varying spatial pattern of voltages comprises applying a light beam having a dynamically varying spatial pattern of intensities to the photoconductive layer such that the resistance across the photoconductive layer varies spatially.

Embodiments of the present invention employ optical addressing of the blue phase liquid crystal material layer.

In an embodiment, the method comprises measuring the optical signal to determine a disturbance in a wavefront of the optical signal and determining the dynamically varying pattern to reduce the disturbance. Such an embodiment provides polarisation independent adaptive optics.

According to a sixth aspect of the present invention, there is provided an optical element. The optical element comprises a first transparent electrode; a second transparent electrode; a variable refractive index layer disposed between the first and second transparent electrodes; and a photoconductive layer disposed between the second transparent electrode and the variable refractive index layer. The variable refractive index layer comprises a material having a first, isotropic refractive index under no applied electric field and a second, different refractive index under an applied electric field wherein the second, different refractive index is isotropic perpendicular to the direction of the applied electric field.

In an embodiment the variable refractive index layer comprises a blue phase liquid crystal material.

In an embodiment the element further comprises a light blocking layer between the variable refractive index layer and the photoconductive layer.

According to a seventh aspect of the present invention there is provided an adaptive optics system comprising an optical element as described above.

Features of the above-described aspects and embodiments of the invention may be combined in any permutation.

Anti-reflection Structures/Coatings

In some preferred embodiments of each of the above described aspects of the invention the (routing) device or optical element incorporates one or more layers with an anti-reflection (AR) coating, for example on an upper transparent (optical input/output) layer of the device/element. Additionally or alternatively one or more internal interfaces of the device/element may also incorporate an anti-reflection coating. In some particular implementations, the characteristics of the AR coating vary over a surface of the device, in particular to optimise different spatial regions of the device/element for different operating wavelengths of the device/element. This is particularly advantageous in an optical system incorporating a wavelength-selective optical demultiplexer, to direct different optical wavelengths to the different spatial regions of the device/element optimised for those wavelengths.

In addition a diffraction pattern displayed on the device may incorporate a component to generate a reflection-cancelling beam, to partially or substantially wholly cancel a reflection from either an internal or external surface interface of the device/element. Preferably the diffraction pattern is configured so that the reflection-cancelling beam is generated by a second (and/or higher) diffraction order (the first diffraction order being used for the intended optical wavefront manipulation, for example routing).

The skilled person will appreciate that these latter techniques may be employed independently of the above described aspects of the invention.

Thus in a further aspect the invention provides an LCOS (liquid crystal on silicon) device comprising a surface bearing an anti-reflection structure, wherein: i) the anti-reflection structure comprises a physical surface having a topography with features having lateral dimensions of less than 2000 nm and having an average refraction index which decreases with distance away from said surface; and ii) a configuration of said topography, averaged over lateral dimensions of greater than 2000 nm, varies with lateral position on said surface.

In embodiments the surface topography comprises a pattern of features, in particular a regular/cyclical pattern of varying height or relief over the surface. Laterally the pattern repeats or has a characteristic length scale (in the case of a random pattern) which is less than the wavelength at which the device operates, for example less than 2000 nm, 1900 nm, 1800 nm, 1700 nm or 1600 nm. However the anti-reflection layer also has one or more parameters of the configuration or structure (for example, average feature pitch and/or feature shape) which, when averaged over distances greater than a wavelength, varies with position on the surface: that is there is a macroscopic variation of the topography. This allows different surface regions of the device to be optimised for different wavelengths, which is useful in many LCOS applications including, but not limited to: optical switching/routing/pulse shaping, holography for example for displaying images, the display of diffraction patterns/holograms for optical tweezers, and more generally any application where wavefront control is desired.

In preferred implementations the surface bearing the topography is a front surface of the device, more particularly a coverplate of the device, although the skilled person will recognise that this is not essential.

In a related aspect the invention provides an LCOS device, in particular as claimed in claim 34 or 35, combined with a controller to display a hologram on said LCOS device to deflect first light into a first diffractive order of said hologram, wherein said hologram is further configured to deflect second light into a second diffraction order of said hologram, wherein said LCOS device has an interface generating unwanted reflected light, and wherein said second light is in antiphase with said unwanted reflected light.

The features of such an LCOS device may be combined with or employed separately to the laterally varying surface topography pattern mentioned previously. Broadly speaking in embodiments, because the first diffractive order is employed for directing the light in whatever way is desired (for example, according to the application as described previously), a second and/or higher diffraction order may be employed to cancel one or more unwanted beams reflected from an internal interface. Thus in embodiments at least a proportion of the second light, and preferably substantially all the second light, is in antiphase with the reflected beam to be cancelled. Preferably the second (reflection-cancellation) beam has substantially the same power as the unwanted reflected light in that direction (the same amplitude and/or intensity). The skilled person will recognise, however, that some benefit may be obtained from the technique even where the beams are not exactly at the same power or exactly in antiphase.

The skilled person will appreciate that because holograms are additive in nature it is straightforward to implement the reflection cancellation beam: to a desired hologram displayed on the SLM it is simply necessary to add a second hologram (adding the respective pixel values) which generates a second (or higher) order beam with the desired power (amplitude/intensity), phase, and direction. The skilled person will be aware of many algorithms which may be employed to perform such a calculation. The power, phase and direction of the unwanted reflection to be cancelled can be readily obtained by numerical modelling of the LCOS device using any of a number standard optical modelling packages—in general the precise amplitude, phase and direction of a reflection to be cancelled will depend upon the detail structure of the LCOS device.

As previously mentioned either or both of the above approaches may be employed to optimise the anti-reflection properties at different respective wavelengths in different respective lateral surface regions of the device.

In a related aspect the invention provides a method of suppressing an unwanted reflection in a spatial light modulator (SLM) comprising a reflective liquid crystal on a silicon backplane having a plurality of pixels with a layer of blue-phase liquid crystal material over said backplane and a counter-electrode over said blue-phase liquid crystal material, the method comprising using said SLM to deflect light into a second or higher diffraction order of a diffraction pattern displayed on said grating, wherein said second or higher order deflected light defines a reflection-cancellation beam in antiphase with said unwanted reflection.

Preferably, as previously described, the SLM is an LCOS SLM. Preferably the unwanted reflection comprises an internal reflection at an interface of the device, although in principle the technique is not restricted to such an internal reflection. The interface may be an internal interface, for example a coverplate/liquid crystal interface such as an interface comprising one or more of a liquid crystal layer, an alignment layer, an electrode layer, and a coverplate layer. The skilled person will appreciate that, depending upon the configuration of the device and/or the thickness of the various layers, the interface may or may not include all of these. For example, in a blue phase device the alignment layer is not required. The reflection cancellation need not be complete, although preferably it is substantially complete.

In a still further related aspect the invention provides a spatial light modulator (SLM) in combination with an SLM controller, said SLM having an interface generating an unwanted reflection, wherein said SLM controller is configured to drive said SLM to deflect light into a second or higher diffraction order of a diffraction pattern displayed on said grating, wherein said second or higher order deflected light defines a reflection-cancellation beam in antiphase with said unwanted reflection.

BRIEF DESCRIPTION OF THE DRAWINGS

In the following embodiments of the invention will be described, by way of example only, with reference to the accompanying drawings in which.

DETAILED DESCRIPTION OF PREFERRED EMBODIMENTS

Figure 1:
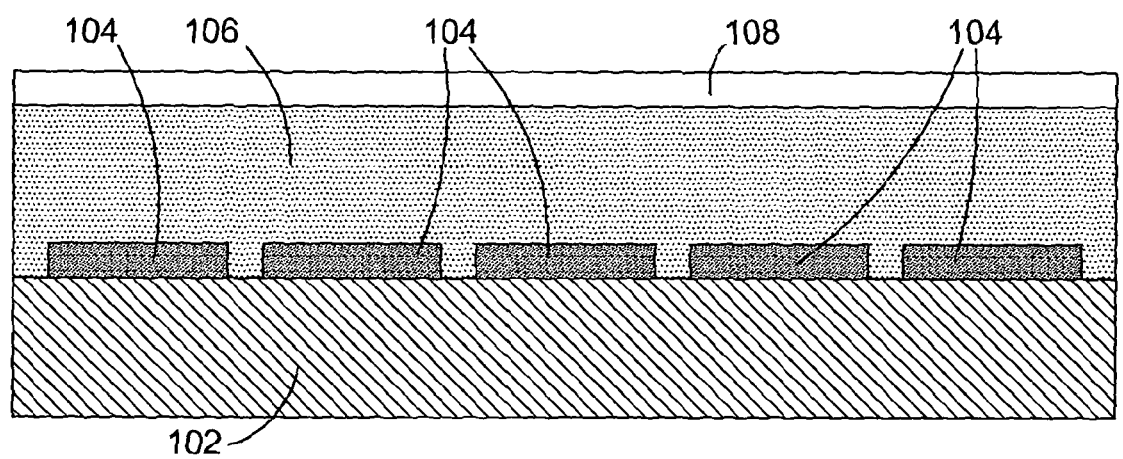
FIG. 1 shows a schematic cross section of an optical routing device.

FIG. 1 shows a schematic cross section of an optical routing device 100. The device is formed on a substrate 102. A plurality of optically reflective pixel electrodes 104 are arranged on the substrate 102. A layer of adjustable refractive index material 106 is arranged over the pixel electrodes 104. A transparent counter electrode 108 is arranged over the layer of adjustable refractive index material 106.

The adjustable refractive index material 106 has a refractive index which varies with the electric field applied across it. An example of such a material is blue phase liquid crystal. The adjustable refractive index material 106 has an isotropic refractive index in the direction perpendicular to the applied electric field.

In the device shown in FIG. 1, by applying a spatially varying pattern of voltages between the electrodes 104 and the counter electrode 108, the refractive index of the adjustable refractive index material 106 can be caused to vary spatially. In order to direct a beam of light incident on the upper surface of the counter electrode 108, a first pattern of voltages is applied across the adjustable refractive index material 106 that cause its refractive index to vary spatially to form a first diffraction grating. The first diffraction grating deflects the incident beam of light in a first direction. To switch the beam of light to a second direction, the applied pattern of voltages is changed to a second pattern of voltages that cause the refractive index of the adjustable refractive index material 106 to vary spatially to form a second diffraction grating.

By switching between different patterns of voltages as described above, an incident beam of light can be switched between different outputs.

If a material that has an isotropic refractive index in the direction perpendicular to the applied electric field is used, the switching is independent of the polarisation of the incident beam.

In the following, the wording isotropic perpendicular to the applied electric field is used to describe that there is substantially no difference in refractive index in any direction perpendicular to the applied electric field, the refractive index may vary in any other direction.

Figure 2:
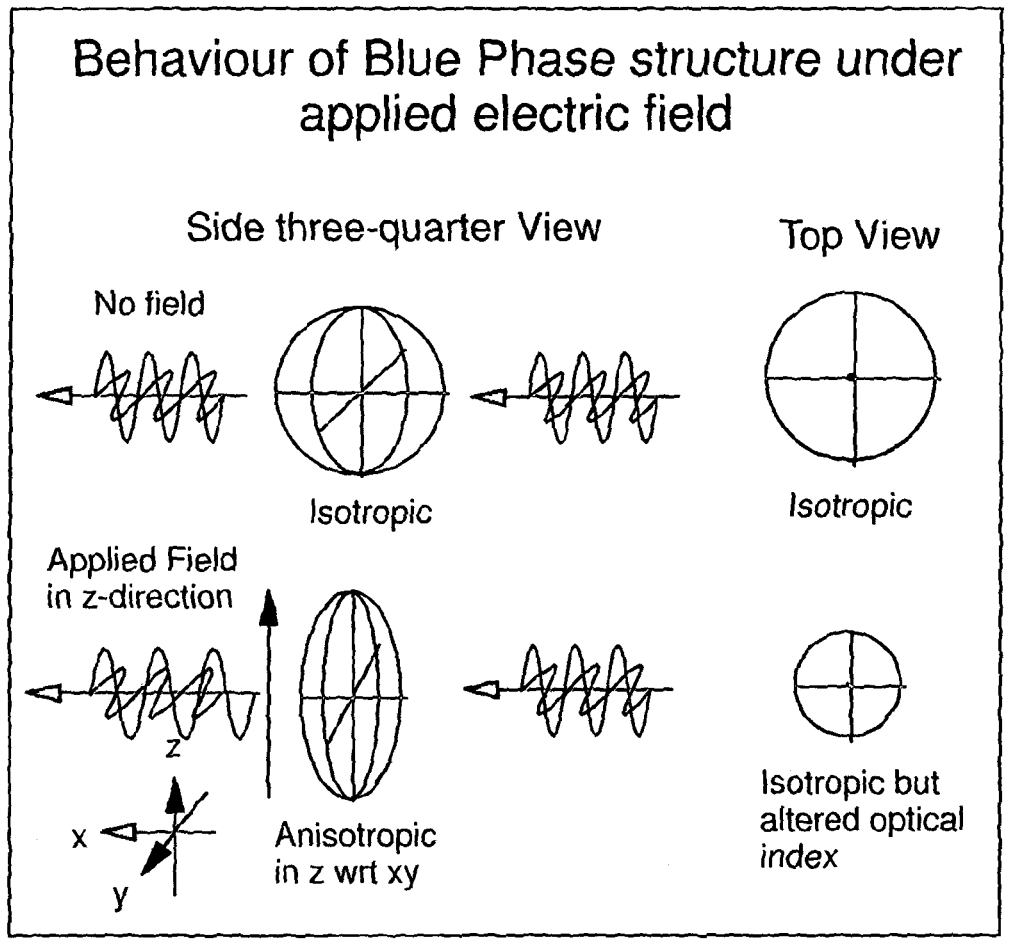
FIG. 2 shows a graph illustrating the behaviour of a blue phase structure under applied electric field.

FIG. 2 shows the behaviour of a blue phase structure under applied electric field. The blue phase liquid crystal has symmetrical domains of liquid crystal molecules arranged in a structure which, with no applied electrical field, is optically isotropic. A blue phase liquid crystal material is a liquid crystal material in a blue phase. Examples of blue phase liquid crystal materials stable over a wide temperature range can be found in US2009/0115957, to which reference may be made—this describes materials stable over a range of greater than 35° C. and/or which are stable at room temperature.

Deforming the domains (e.g. by applying an electric field) along the propagation direction of the light can be used to modulate polarised light, since the deformed domain undergoes a change in optical refractive index and becomes optically anisotropic. If the deformation is along the light transmission axis so that the deformed domain is still symmetrical normal to the light transmission, a localised change in refractive index occurs which is independent of the incident polarisation angle, and can be used to produce SLMs capable of polarisation independent phase modulation.

The behaviour discussed above was experimentally demonstrated as follows. A liquid crystal LCM-PSBP.1328UV (from LC Matter Corp.) was used for the experiment. A 12 micron thick glass cell with ITO electrodes and no other alignment layers was filled with the mixture. Square waveform voltage with frequency of 1 kHz was applied across the cell in order to introduce anisotropy in the Blue Phase.

Figure 3:
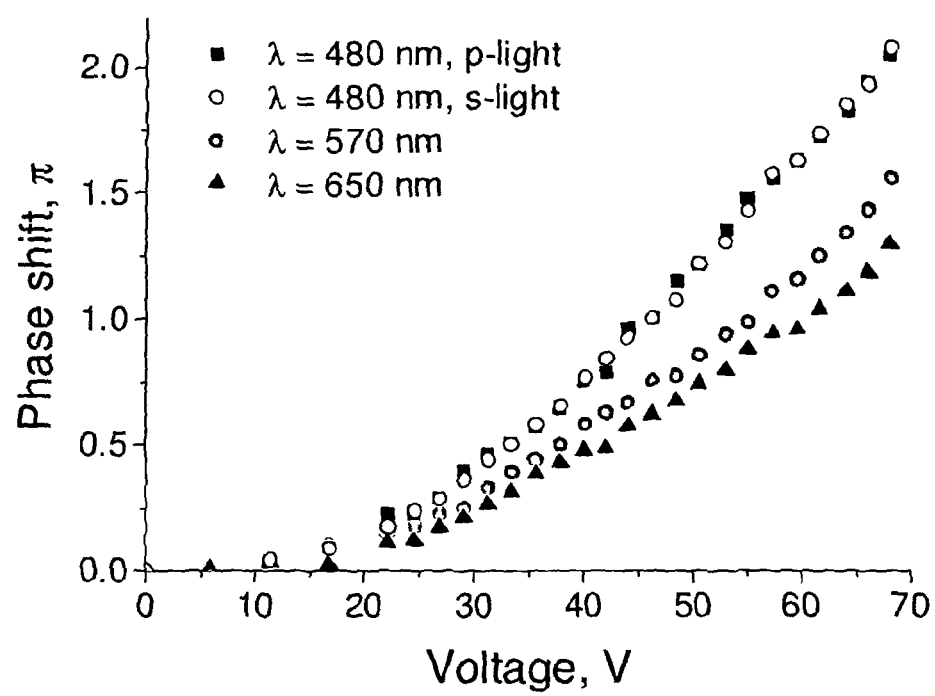
FIG. 3 shows the phase shift of light transmitted through a cell as a function of voltage for three wavelengths and both polarisations.

FIG. 3 shows the phase shift of light transmitted through the cell as a function of voltage for three wavelengths and both polarisations. Phase shift was identical for both polarisations within the range of applied voltage for any wavelength. For wavelength of 480 nm, a 68 volt square wave at 1 kHz gave a phase shift as shown of greater than $2\pi$.

Figure 4:
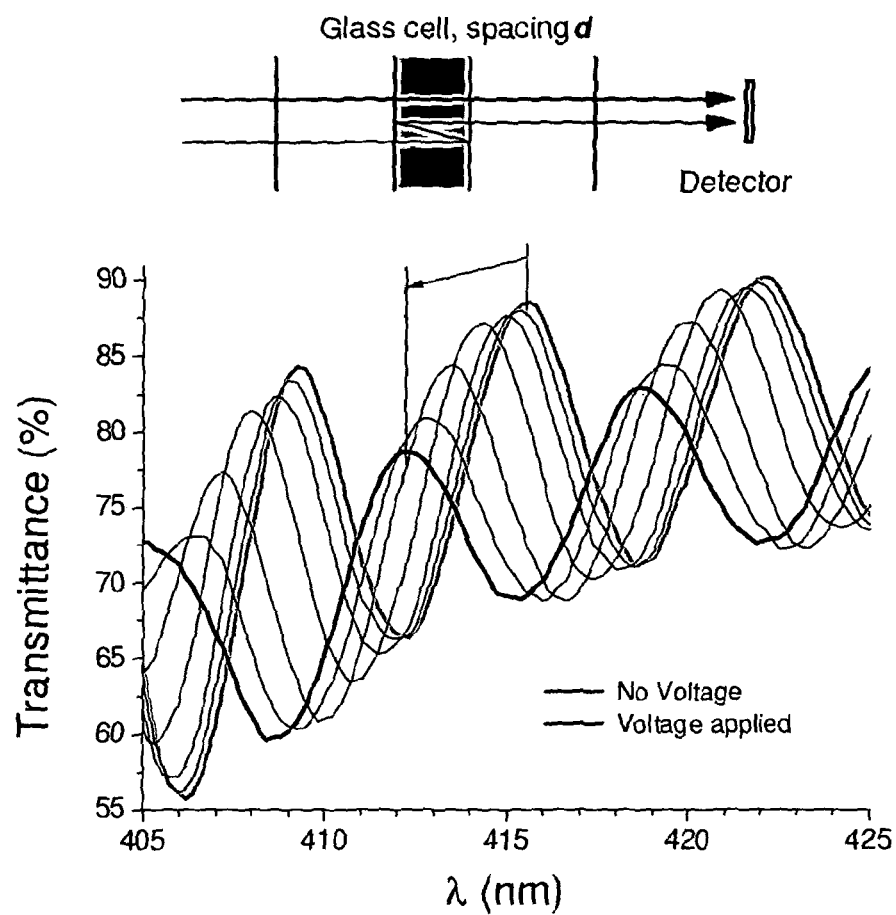
FIG. 4 shows the cell and detected intensity of light detected.

Phase shift was measured using a cell as a Fabry-Perot interferometer. The cell and detected intensity are shown in FIG. 4. The spectrum of the light transmitted through the cell showed a characteristic interference pattern due to the direct and double-reflected light in the cell. The positions of the interference peaks depend on the refractive index of the material and move as voltage applied across the cell.

The high voltage required to get $2\pi$ phase shift reflects the fact the material has low Kerr constant (K) of 1.6 nm/V2 at 600 nm. The drive voltage and cell thickness should be reduced considerably by using materials with the large Kerr constant (K up to 12.7 nm/V2) that have been recently developed for in-plane switching display applications. For this material a $2\pi$ phase shift at 600 nm wavelength should be obtained with a 10 μm reflective cell and driving voltage of ±14V, well within the range of LCOS backplanes.

Thus, the inventors have demonstrated a method for phase modulation of randomly polarised light.

It is envisaged that the liquid crystal material may be chosen in order to get a wide temperature range blue phase. Mixtures of a liquid crystal and a polymer have been shown to stabilise the blue phase in a temperature range from 60 C to −10 C degrees. In order to stabilise the blue phase in a temperature range, the blue phase material may be doped with nanoparticles. This improves the sensitivity of the blue phase material to electric fields.

Another possibility is the use of bimesogenic liquid crystals.

The Blue Phase has the additional advantage that no alignment or rubbing layers are required. This makes possible simplified polarisation-independent telecoms routing.

Figure 5:
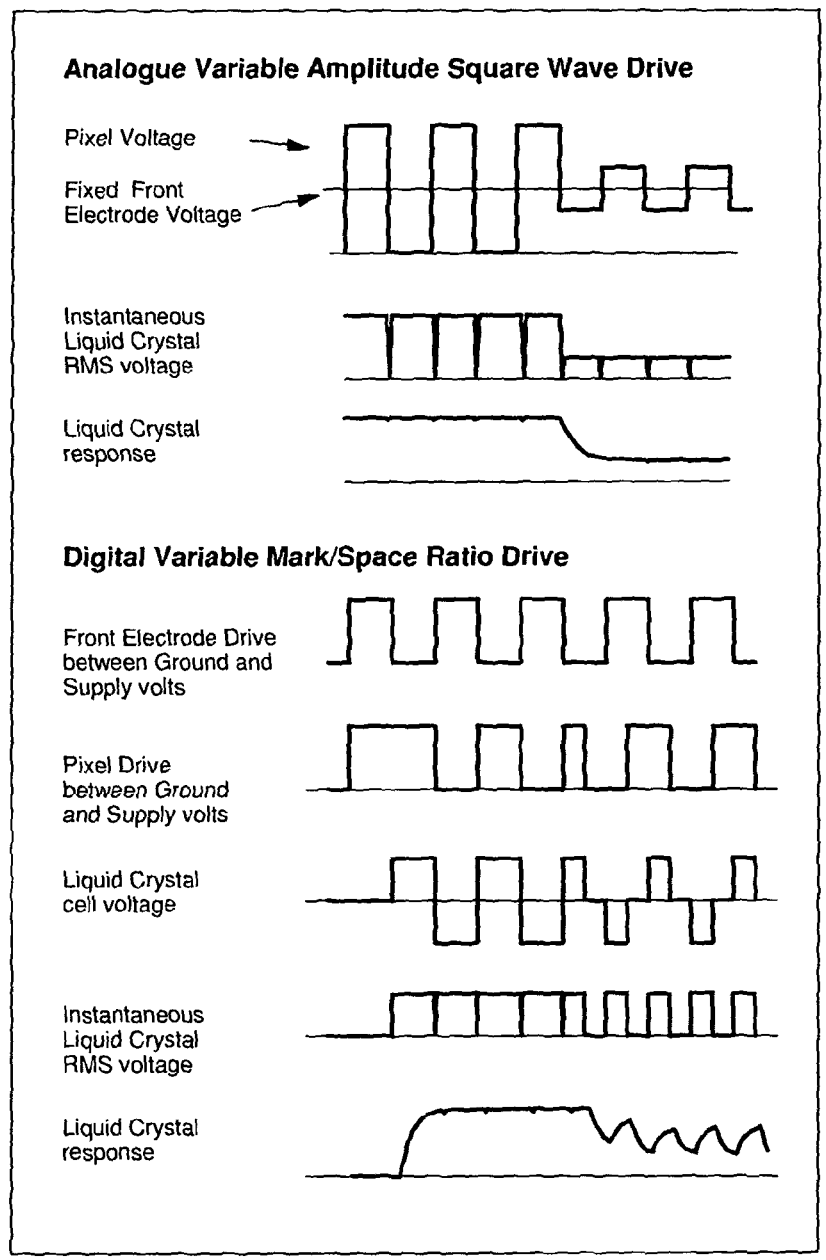
FIG. 5 shows voltage schemes for driving liquid crystal material on top of an LCOS backplane.

FIG. 5 shows two ways of driving the liquid crystal (LC) material on top of the LCOS backplane. The first driving scheme is an analogue variable amplitude square wave drive. Here the counter electrode which is the front electrode (FE) of the LCOS device is maintained permanently at half the supply voltage of the pixel driver transistors, and a variable amplitude square wave is applied to the pixels to give a symmetrical dc-balanced square wave of adjustable amplitude across the pixels. The mean RMS voltage determines the state of the LC.

The second method, digital variable mark/space ratio drive, involves applying a square wave to the front electrode of the same amplitude as the supply voltage, and the pixels are switched at different times between the supply or ground. This allows a dc-balanced but asymmetrically timed waveform across the LC which has a variable RMS value, to which the LC responds, giving an average response similar to the fixed FE version, but with small variations as the LC follows the waveform.

The latter method is satisfactory for image projection applications, but causes unacceptable phase flicker which decreases the efficiency of phase holograms. However it allows twice the drive voltage across the liquid crystal from the same backplane process, or for the same voltage requires a lower voltage process, allowing smaller transistors and therefore higher integration, lower power, and lower cost.

Since rows of pixels are usually loaded sequentially down the pixel array a combination of the two causes progressive loss of drive and increased phase flicker down the pixel array.

The blue phase liquid crystal responds more rapidly to the applied electric field than a nematic phase liquid crystal. As shown in FIG. 3, the refractive index change is proportional to the square of the applied field. This means that for a given backplane voltage swing the phase modulation may be quite small, and may require a very high drive voltage.

Figure 6:
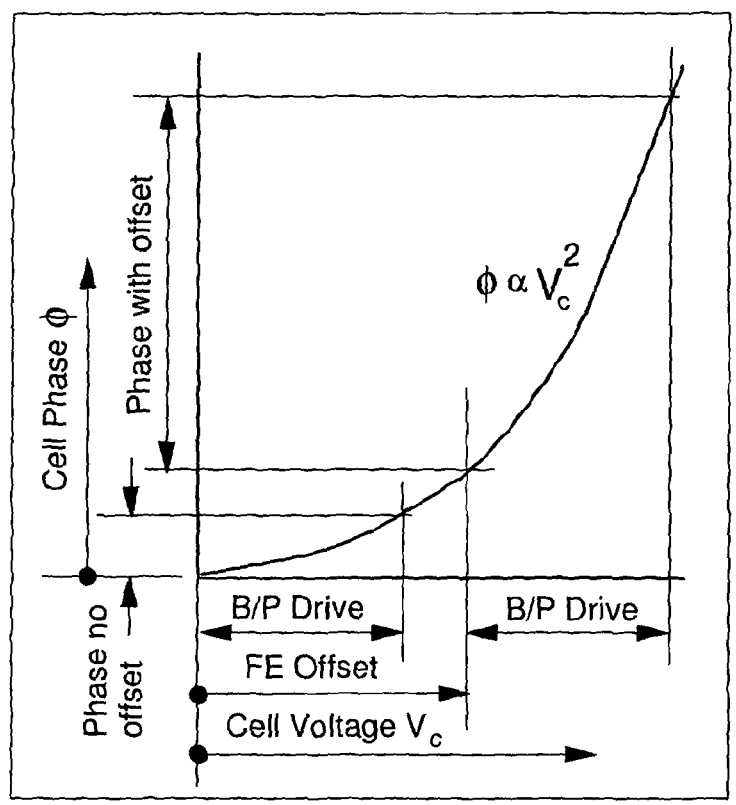
FIG. 6 shows a phase/voltage curve for a cell.

FIG. 6 shows a phase/voltage curve for a cell. If the backplane drive swing can be pushed further up the response curve, it is possible to get an improved phase modulation for the same backplane swing. As can be seen in FIG. 6, by offsetting the B/P Drive voltage, the phase response can be increased from the range shown as 'Phase no offset' to the range 'Phase with offset'. This can be implemented by "overswitching" the front electrode above the supply rail and below ground to produce an offset added to the backplane drive voltage, but only by using the second drive scheme described above. A combination of the first and second schemes allows this; rather than switch between the supply rails, the pixels are switched at the FE transition time to different analogue voltages, thus giving a controllable variable amplitude square wave drive with a separately defined offset.

Figure 6A:
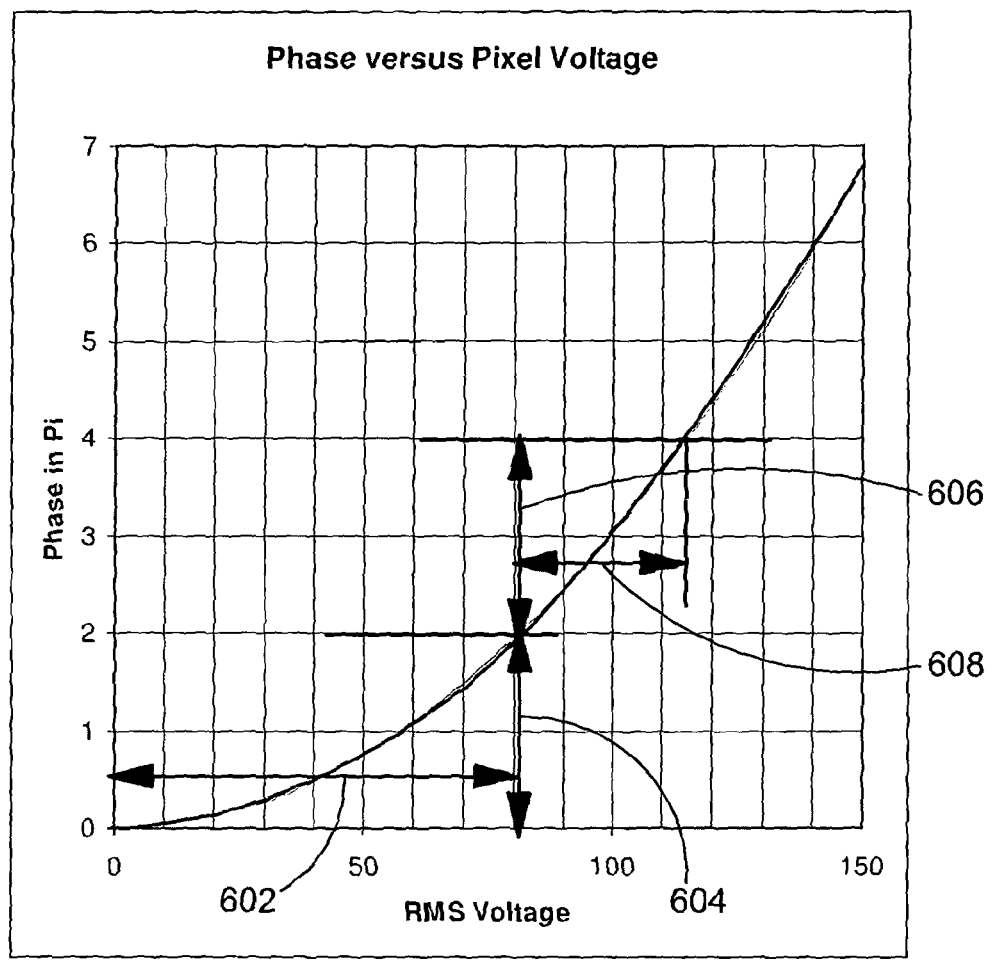
FIG. 6a shows an example phase/voltage curve for a cell.

FIG. 6a shows a graph of phase modulation in steps of pi against drive voltage across a cell. The phase modulation is proportional to the square of the voltage applied across the cell. FIG. 6a shows example values for the voltage and phase modulation to demonstrate the effect of offsetting the voltage on the phase change.

As can be seen in FIG. 6a, from 0 volts a drive voltage of 82 volts 602 is required to give a phase shift of 2pi 604. However, if an offset of 82 volts is applied, if takes only 35 volts 608 of change to give the same differential phase modulation 606. If the front electrode is switched above and below the supply rail by this voltage, the modulation required to drive the pixel is reduced from around 80 volts to around 35 volts.

Figure 7:
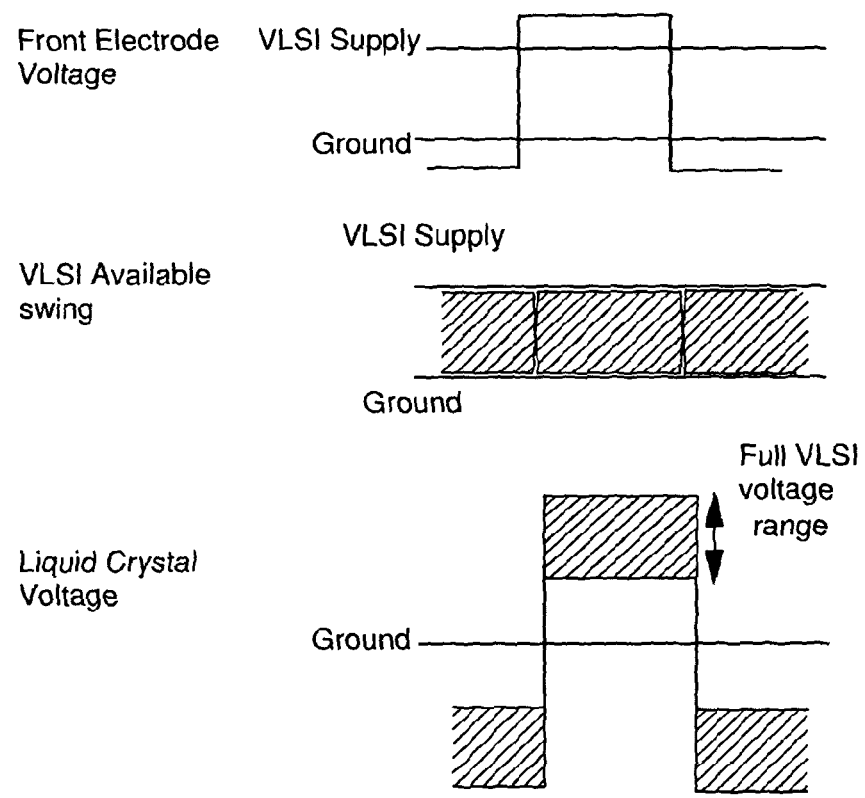
FIG. 7 a driving scheme for a cell having a controllable variable amplitude square wave drive with a separately defined offset.

FIG. 7 shows such a driving scheme. The front electrode (FE) voltage is "overswitched" above and below the VLSI supply voltage and Ground. This allows the full VLSI voltage range to be used for phase control further up the phase/voltage curve shown in FIG. 6.

However for this to work on a large 2-dimensional pixel array, all the rows of pixels have to be loaded on the FE transition, otherwise phase flicker will be reintroduced which will get progressively worse down the rows of refreshed pixels.

The chip can be designed so that rows of rectangular pixels forming 1-dimensional arrays, suitable for grating-type holograms, can be driven, with a horizontally segmented FE. This allows a separate driver for each FE segment, ensuring that the FE switches at the same time that the pixels are refreshed, eliminating the phase flicker, and allowing the LC drive to be offset up the response curve.

For a multiple wavelength routing device a system can be designed to ensure that the separated wavelengths fall onto the required segments. Such a system requires a reasonably polarisation independent wavelength splitting grating and allows a single-device polarisation independent router.

Figure 8:
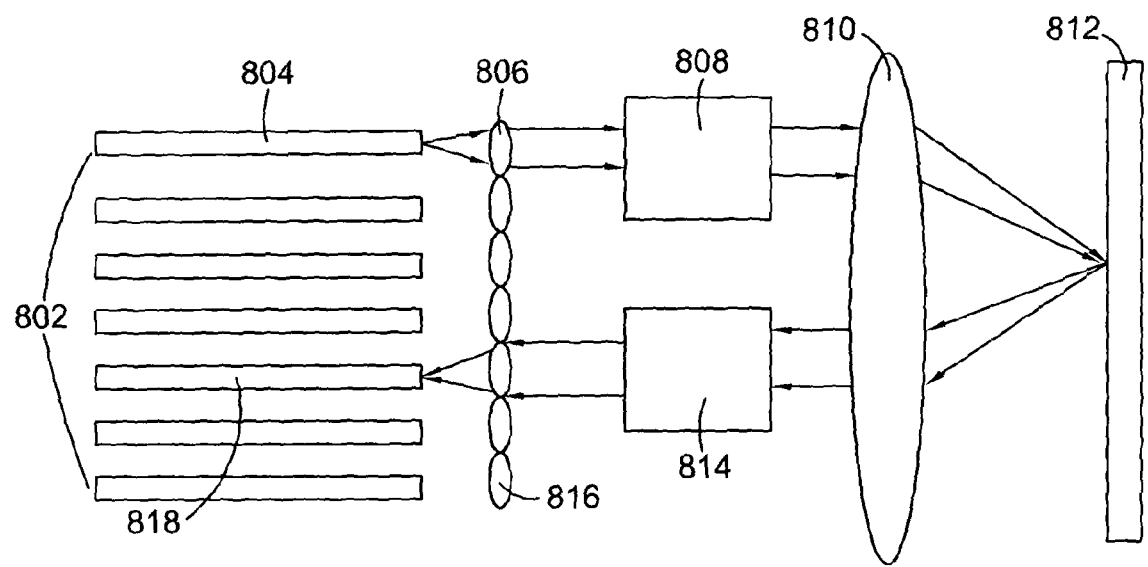
FIGS. 8 and 9 show a system diagram for a multiple wavelength polarisation independent router.
Figure 9:
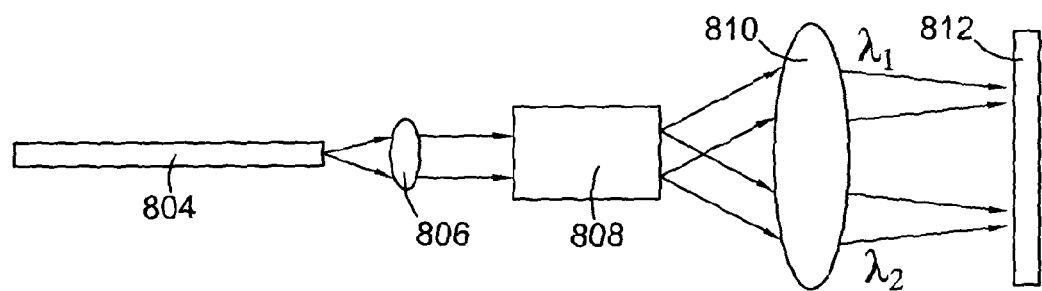

FIGS. 8 and 9 show a system diagram for a multiple wavelength polarisation independent router 800. FIG. 8 is a side-view and FIG. 9 is a top view.

The router 800 switches signals between fibres of a fibre array 802. An input signal is received in an input fibre 802. This is switched to one or more output fibres depending on the state of the switch. The input signal is passes through a lens 806 and is wavelength demultiplexed by wavelength demultiplexer 808. Different wavelengths are directed to different areas of the LCOS device 812. The LCOS device 812 applies a hologram/grating which deflects the wavelength incident on that particular area in the direction orthogonal to the wavelength splitting axis. The beam is reflected through a wavelength multiplexer 814 which collects together all the wavelengths which have been deflected by a given angle and these are then focussed by a lens 816 into the corresponding output fibre 818. The angle of deflection (inversely proportional to grating pitch) determines the destination fibre.

This LCOS device can be segmented by having strips of ITO on the cover glass each corresponding to a separate wavelength channel, so that each wavelength can be driven independently of other wavelengths.

Figure 10:
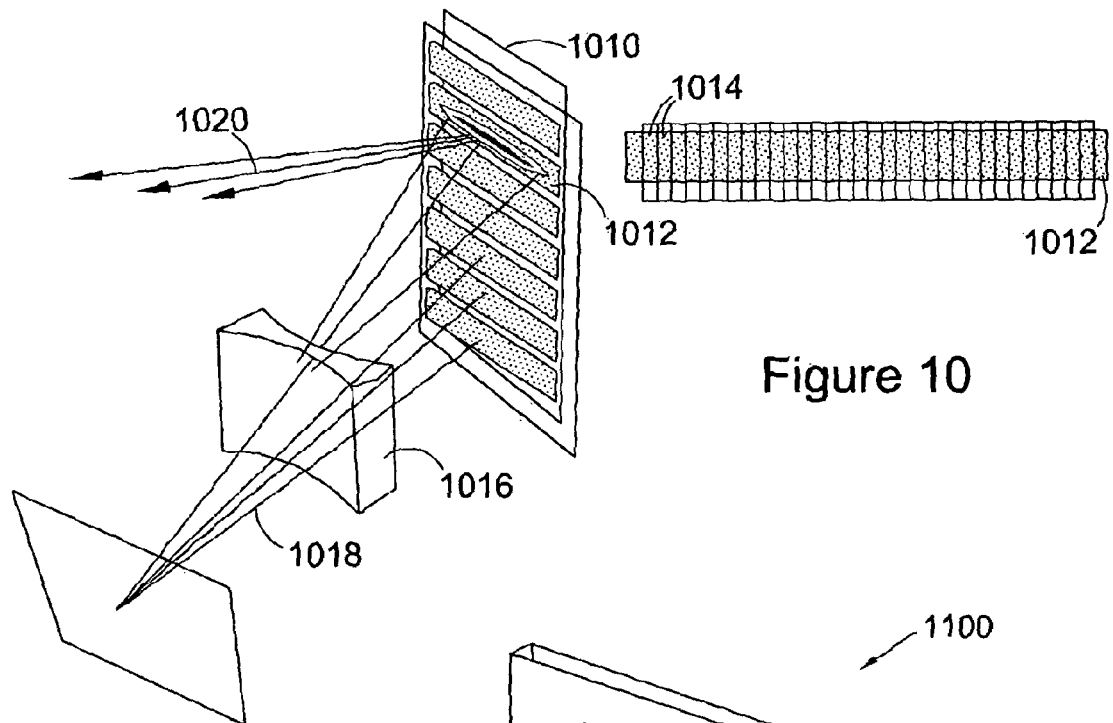
FIG. 10 shows a switching device with a segmented front electrode.

FIG. 10 shows a switching device 1000 with a segmented front electrode. The LCOS device 1010 has a front electrode divided into strips 1012. Each strip 1012 covers a plurality of electrodes 1014 on the opposing side of the variable refractive index material. The wavelength demultiplexer directs different wavelengths of the input signal 1018 to different strips. The pixel dimensions on the LCOS backplane are between 1.6 and 15 microns.

Beneath each front electrode strip there is a one-dimensional strip having the same width as the front electrode strip. The pixels may be rectangular as shown in FIG. 10, or may be square.

The segments which form the diffraction grating can be up to 20 mm high and unto 100 microns wide.

Figure 11:
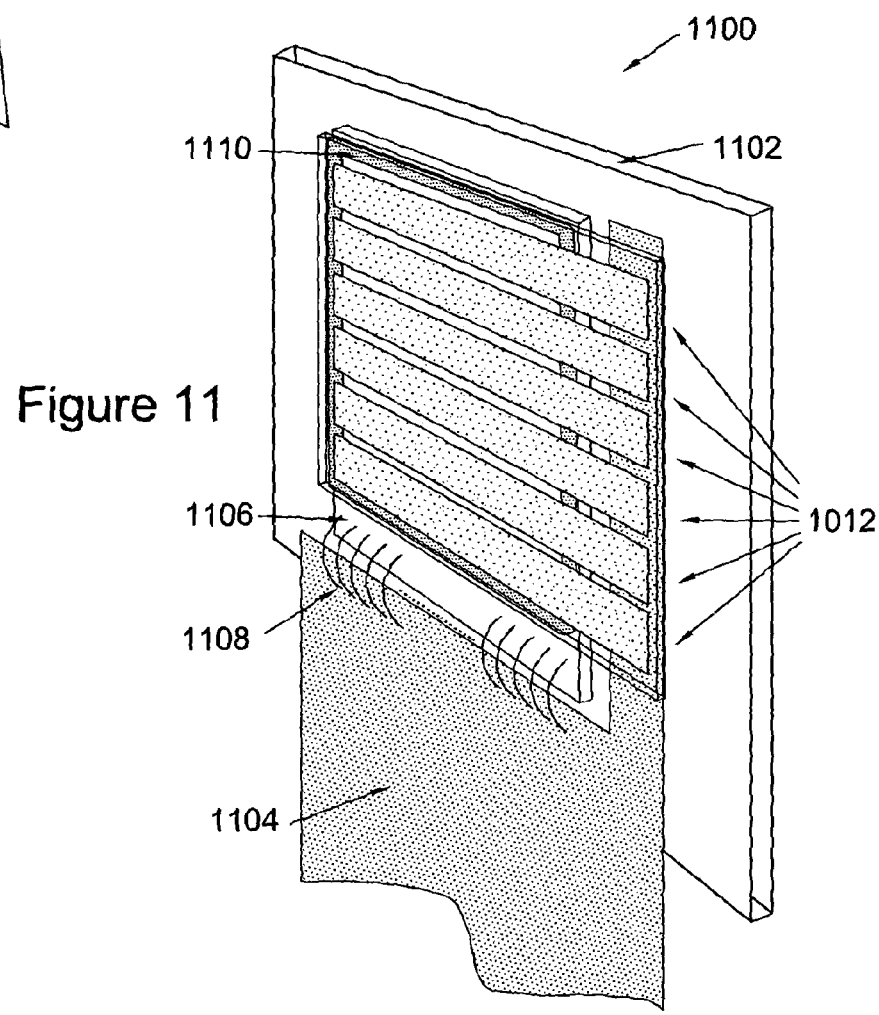
FIG. 11 shows a switching device mounted on a substrate.

FIG. 11 shows a switching device 1100. The device is mounted on a substrate 1102. A temperature control may be attached to the substrate 1102 which controls the temperature of the device so that the liquid crystal material is maintained in the blue phase. A flexible PCB 1104 is mounted on the substrate 1102. An active backplane 1106 is also mounted on the substrate 1102. The active backplane 1106 runs under a layer of blue phase liquid crystal material. Bonding wires 1108 connect the active backplane 1106 to the flexible PCT 1104. A front glass cover 1110 is located over the layer of blue phase liquid crystal material. The glass cover carries stripe front electrodes 1112 which run across the blue phase liquid crystal material. The flexible PCB runs beside the edge of the blue phase liquid crystal material and the glass over overlaps the flexible PCB 1112, this allows connections between the flexible PCB 1104 and the front electrodes 1112 to be made.

The front electrode connections are made by silver loaded epoxy from the ITO front electrodes on the front glass cover.

Figure 12:
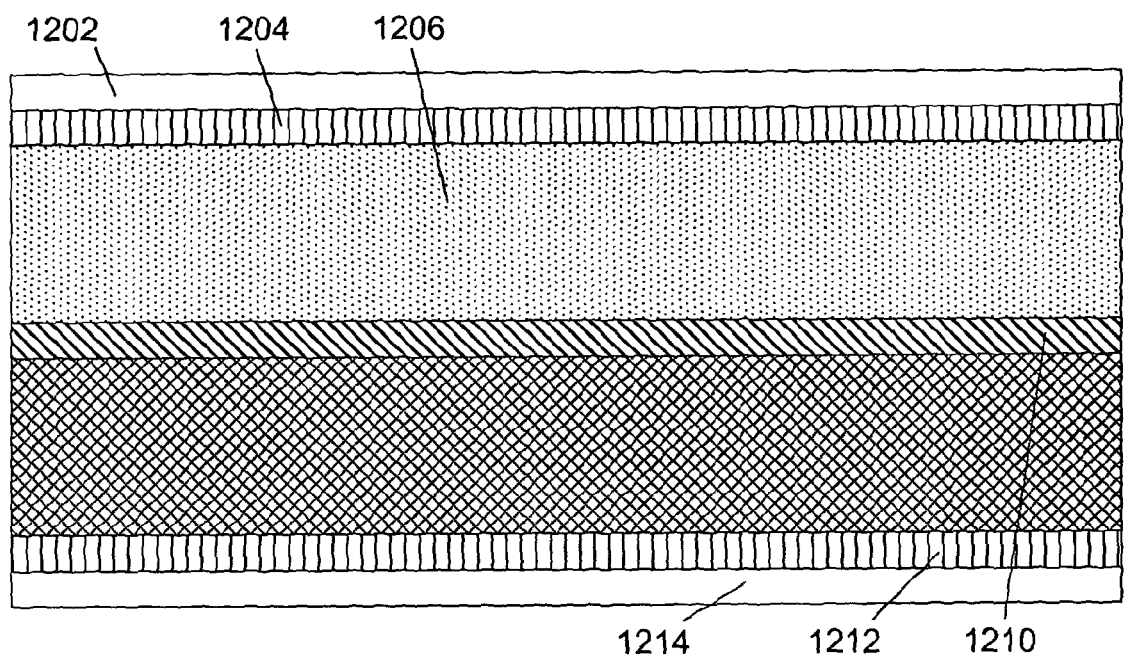
FIG. 12 shows a cross section of an optical device.

FIG. 12 shows a cross section of an optical device 1200. The device has a transparent substrate 1202. The transparent substrate is formed from glass. A transparent electrode formed by transparent conducting oxide layer 1204 is coated on the substrate 1202. The transparent conducting oxide layer is, for example, formed from Indium tin oxide. Beneath the transparent conducting oxide layer 1204 there is a layer of adjustable refractive index material 1206. The layer of adjustable refractive index material 1206 is, for example a layer of blue phase liquid crystal as described above. Beneath the adjustable refractive index layer 1206, there is a reflective layer 1210. The reflective layer is formed from for example, 15 layers of zinc sulfide and magnesium fluoride. Beneath the light blocking layer 1210 there is a layer of a photoconductive material 1208. The photoconductive layer 1208 is, for example, formed from hydrogenated amorphous silicon or cadmium sulfide. Beneath the photoconductive layer 1208, there is a second transparent electrode which is formed by transparent conducting oxide layer 1212 coated on a second transparent substrate 1214. The first and second electrodes are planar and occupy planes that are parallel and spaced apart with the photoconductive layer and the adjustable refractive index material are disposed between the first and second electrodes.

Figure 13:
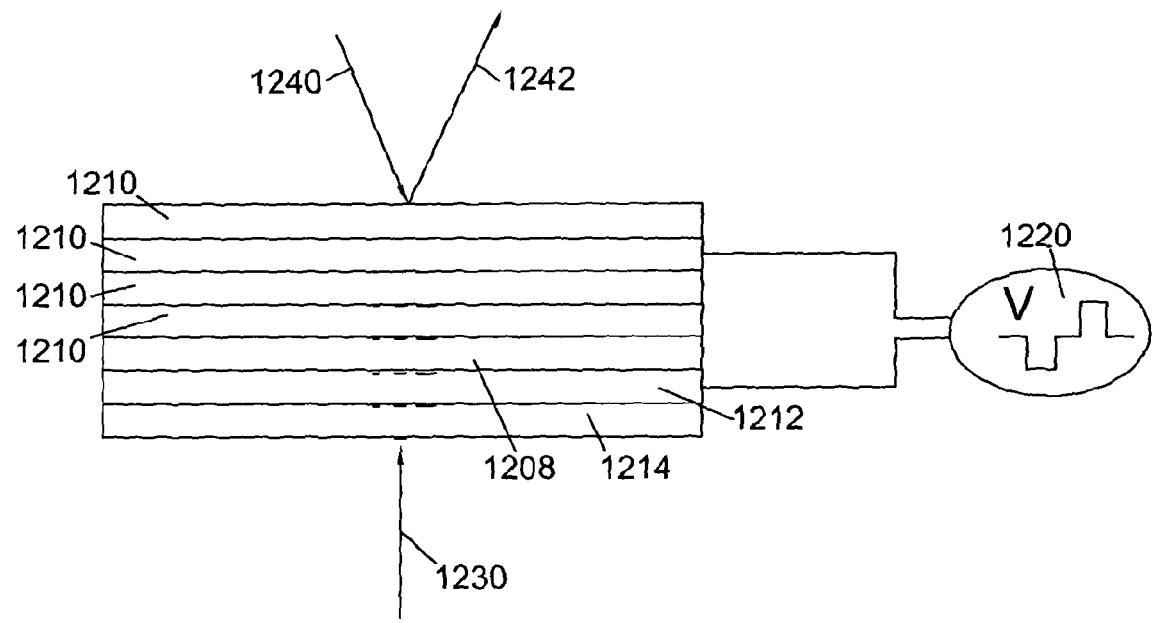
FIG. 13 shows an optical device in use.

FIG. 13 shows the optical device 1200 in use. A voltage waveform 1220 is applied between the electrodes formed by the transparent conducting oxide layers 1204 and 1212. A write beam 1230 of light which varies laterally across the device is applied to the device through the substrate 1214. The write beam 1230 causes the conductivity of the photoconductive layer 1208 to vary spatially. Since the conductivity of the photoconductive layer 1208 varies spatially, the voltage across the adjustable refractive index layer 1206 will vary spatially corresponding to the spatial variation in the write beam 1230.

A read beam 1240 is incident on the substrate 1202 on the side of the device including the adjustable refractive index layer 1206. The variation in the voltage across the variable refractive index layer 1206 causes the refractive index of the variable refractive index layer to vary spatially. Therefore, the phase of the outgoing light 1242 reflected from the reflective layer 1210 can be modified. The reflective layer 1210 stops the write beam from passing through the device and the read beam from activating the photoconducting layer.

The voltage waveform 1220 may take the form described in reference to FIGS. 5 to 7 above. It is noted that an optically driven device as shown in FIGS. 12 and 13 may be driven with higher voltages than those available from an LCOS backplane.

In place of or in addition to the reflective layer, the device may also comprise a light blocking layer. Such a light blocking layer could be arranged below the reflective layer and configured to absorb the 1-5% of residual light and stop it hitting the photoconductive layer.

In an alternative embodiment, the device may be used in a transmissive configuration. In this configuration, there is no reflective layer and the read beam of light passes through the device. In such an embodiment, different wavelengths of light are used for the read and write beams of light or each beam is pulsed in a different part of the voltage waveform.

Figure 14:
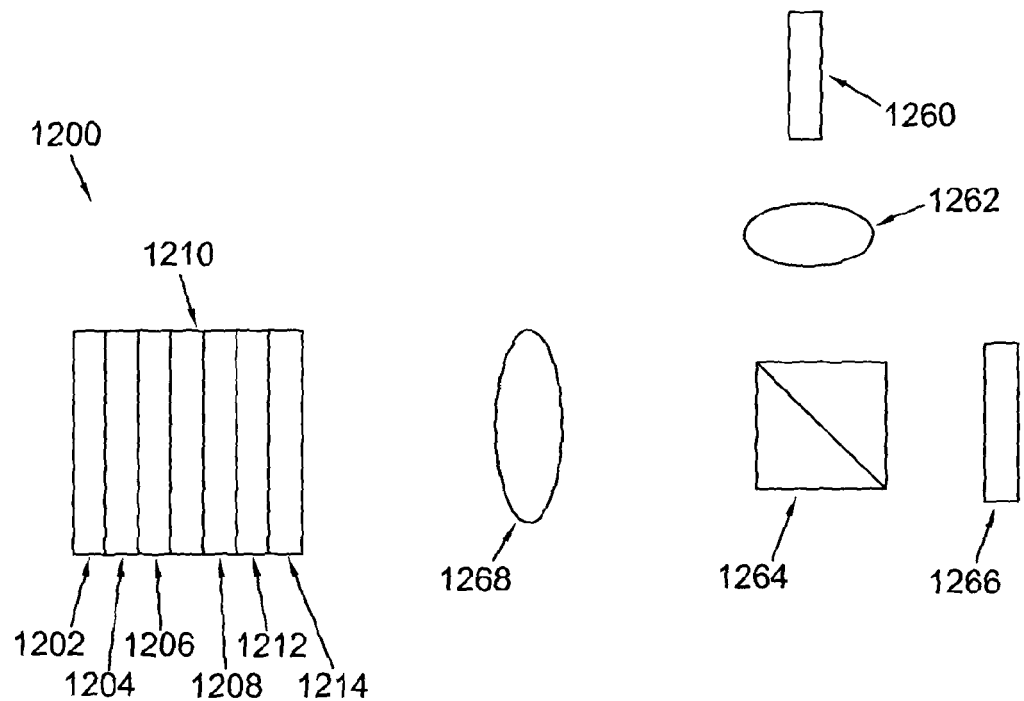
FIG. 14 shows an apparatus for modifying the phase of a beam of light.

FIG. 14 shows an apparatus for modifying the phase of a beam of light using the device 1200 described above with reference to FIGS. 12 and 13. The apparatus has a light source 1260 such as a laser or high brightness light emitting diode. The light from the light source is collimated by a lens 1262 onto a beamsplitter 1264. The beamsplitter directs the light onto a microdisplay 1266. The microdisplay 1266 may be a liquid crystal on silicon display or a digital light processing display. The microdisplay 1266 sets the pattern of the write beam which will be incident on the device 1200. The signal from the microdisplay 1266 passes back through the beamsplitter 1264 and then through a relay lens 1268. The signal is imaged on the transparent substrate 1214 of the device 1200. The spatial variation of intensity of the write signal causes the resistance of the photoconductive layer 1208 to vary according to the electrical signal that is input to the microdisplay 1266. This variation causes the voltage across the variable refractive index material 1206 caused by the voltage between the electrodes 1212 and 1204 to vary. A read light, for example a signal to be routed or a signal having its wavefront modified is incident upon the substrate 1202 on the opposite side from the side on which the write signal is incident. The read signal is modified by the refractive index of the variable refractive index layer 1206, however since the refractive index of the variable refractive index material is isotropic in the direction perpendicular to the applied electric field, the modification of the read signal is polarisation independent.

The device described above has applications in adaptive optics. Light travelling through a medium can be disrupted by variations in refractive index—e.g. in the atmosphere due to turbulence arising from pressure changes or convection caused by temperature changes. For any object viewed in the far field, this alters the shape of the plane wave across the entry optics, and limits the resolution of the optics below the theoretical limit. E.g. for an astronomical telescope this gives a blurred jittering image of a star which should be a point source. For planetary or surveillance images this also gives instantaneous spatial distortion.

Adaptive optics can partially compensate for the disturbance, usually by using a deformable mirror with an array of electro-mechanical actuators. These can correct the wavefront deformation of a few microns and partially restore the wavefront.

Figure 15:
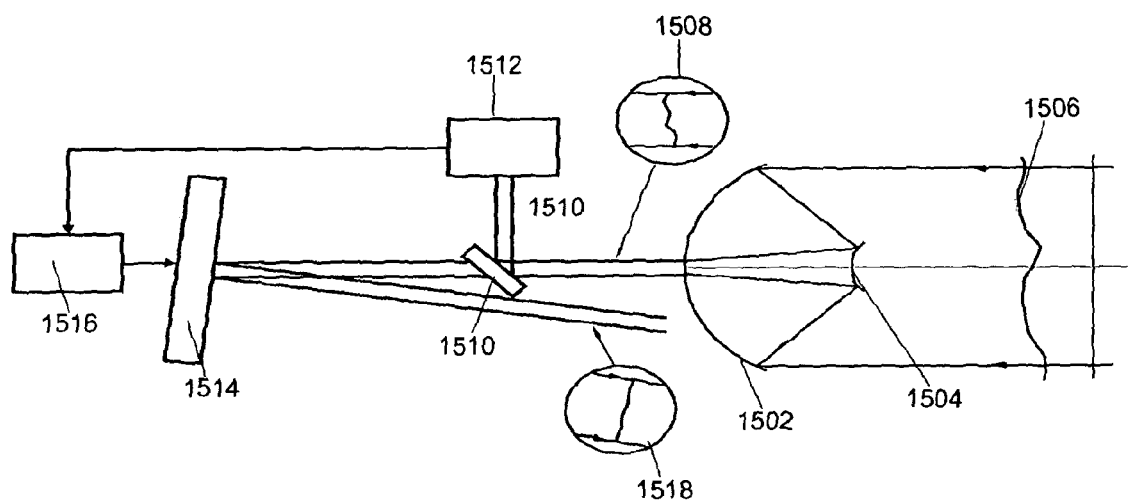
FIG. 15 shows an adaptive optics system applied to a telescope.

FIG. 15 shows an adaptive optics system applied to a telescope. The telescope 1500 has a concave mirror 1502 and a convex mirror 1504. The waveform 1506 of light coming into the telescope 1500 has fluctuations due to atmospheric disturbance. The fluctuating waveform is focussed by the mirrors 1502 1504 to give an input waveform 1508.

The input waveform 1508 is partially split by a beamsplitter 1510. Part of the beam is incident upon a wavefront sensor 1512 and the remaining part of the beam is incident upon an active phase correction device 1514 which comprises a layer of variable refractive index material such as blue phase liquid crystal as described above. The output of the wavefront sensor 1512 is used by an adaptive optics correction controller 1516 to control the spatial variation of the voltage applied across the variable refractive index material and thereby control the phase correction. The corrected beam 1518 is output to imaging optics of the telescope.

Adaptive optics can also be used to correct for aberrations in optical systems, improving vision to a greater extent than lens correction, and e.g. for laser surgery, when the imperfections of the eye's lens must be corrected for retinal welding, etc.

Many adaptive optics applications require polarisation independence and a rapid (millisecond) response time, the devices described above are suited to these applications since they allow for polarisation independent phase correction without a requirement for moving parts such as adjustable mirrors.

FIG. 15 shows an open-loop system, however, those of skill in the art will recognise that the devices described above could also be applied to a closed loop system.

Figure 16:
FIG. 16 shows a system for modifying the phase of a beam of light in a transmissive configuration.

FIG. 16 shows a system for modifying the phase of a beam of light which has an active phase correction device in a transmissive configuration. A beam of light from a source 1702 is broadened and deflected by atmospheric interference to give waveforms 1704 with fluctuations 1704. The phase correction device 1706 corrects the phase of the beam to give a phase flat beam.

The devices described above provide polarisation independent phase modulation for light beams of normal incidence. For beams with a non-zero angle of incidence, some polarisation dependence is introduced into the phase change.

Figure 17:
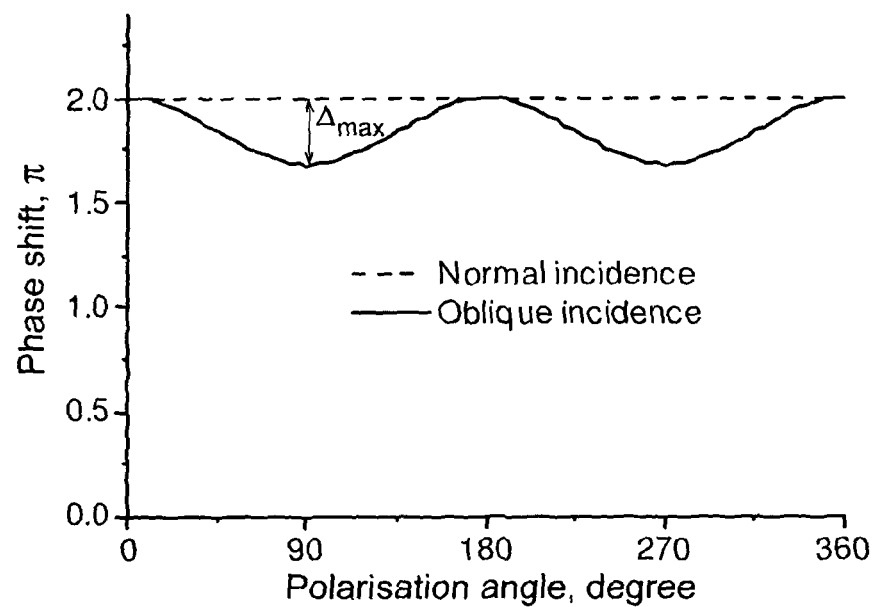
FIG. 17 shows a graph of phase shift as a function of angle of incidence for normal and oblique incidence.

FIG. 17 shows phase shift as a function of the polarisation angle for normal and oblique incidence. There is a phase change of up to $\Delta_{max}$ for light beams incident at a non-zero angle of incidence.

Figure 18:
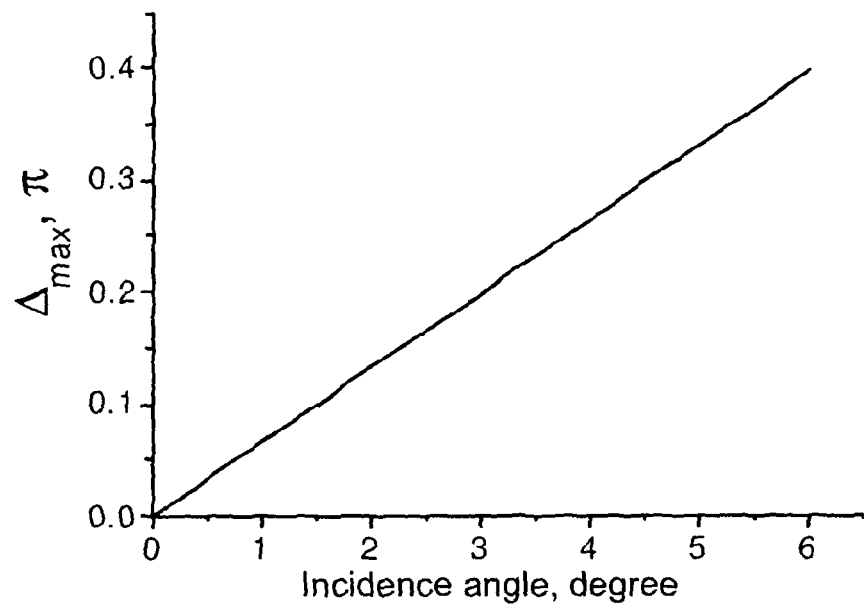
FIG. 18 shows the maximum variation of the phase shift as a function of the incidence angle.

FIG. 18 shows Maximum variation of the phase shift as a function of the incidence angle. For normal incidence the polarisation ellipsoid is seen along its long axis as a circle, therefore, the phase shift is independent of the polarisation angle. For any oblique incidence the polarisation ellipsoid is seen at some angle as an ellipse, therefore, the phase shift is now depends on the polarisation angle.

As can be seen from FIGS. 17 and 18, the angle of incidence is preferably kept low to ensure that the phase shift is relatively polarisation independent. If a variation of A/8 is the accepted variation then the angle of incidence of the incoming beam should be kept within 5 degrees.

Anti-reflection Structures/Coatings

We will now describe how the performance of blue phase and other LCOS SLMs can be enhanced using structured surfaces on the front SLM cover-plate to reduce reflections. This is particularly applicable to wavelength selective switches, where a very low reflectivity over a large bandwidth is desirable.

Figure 19:
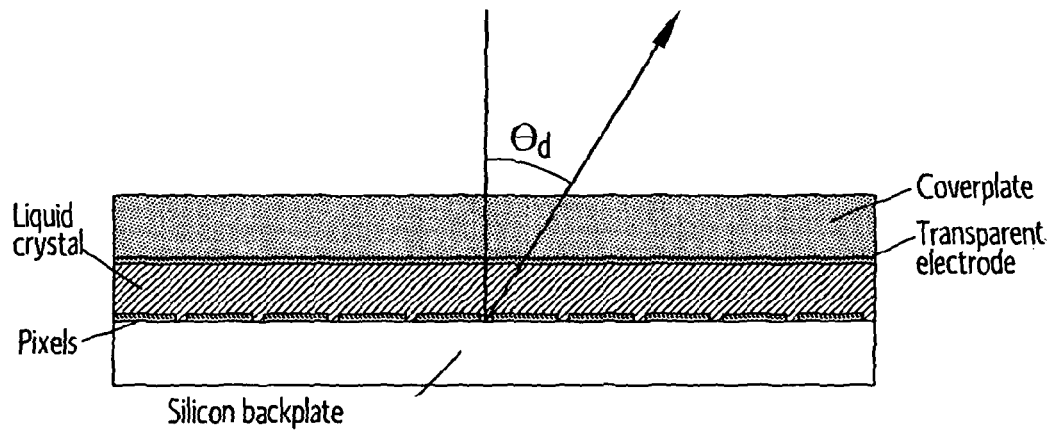
FIG. 19 shows a schematic diagram of a LCOS SLM.

The example LCOS SLM of FIG. 19 has three components: a silicon backplane, a coverplate with a common electrode on one surface, and a liquid crystal layer. The coverplate is typically float glass with a thin-film anti-reflection coating on the front surface, and an ITO layer. Optionally, a liquid crystal alignment layer may be provided on the back surface, although this is not required for a blue phase device. Ideally, both the front coverplate surface and the coverplate/liquid crystal interface (comprising glass, ITO, optional alignment layer, and liquid crystal layers) have zero reflectivity. Thus the wavefront exiting the SLM is solely affected by the phase delay imparted across the liquid crystal layer.

For most applications, the front surface reflectivity can be sufficiently reduced through the use of standard thin film coatings. However, for telecom applications, such as the implementation of wavelength selective switches based on beam-steering, the reflectivity of the front surface should preferably be reduced to $R_f$<0.01% over a wide wavelength range in order to minimize crosstalk. To illustrate this consider FIG. 20, where a plane wave at an angle of $\theta_i$ is incident on a LCOS SLM that displays an ideal blazed grating of period T. A fraction of the signal beam (m=1) is reflected back towards the blazed grating which is re-diffracted such that it travels in the same direction as the m=2 order. The m$^{th}$ diffraction order of the grating is diffracted through an angle of $\theta_m$ according to $$\sin\theta_m = \sin\theta_i + \frac{m\lambda}{T} \quad (1)$$

where $\lambda$ is the wavelength of the light and the angles are the values measured in air. For an ideal blazed grating, all the light is diffracted into the m=+1 order. However, due to spatial and phase quantization of the grating, some light ends up in higher and symmetric (m≠1) orders. For certain switch geometries, light in these m#1 orders can couple into output ports leading to crosstalk. For practical telecom applications the crosstalk should preferably be suppressed to <−40 dB.

Consider the case where $\theta_i$=0. As mentioned, ideally all the light is diffracted into the +1 order through an angle of $\theta_1$. However, if the front surface of the SLM has a finite reflectivity of $R_f$, a portion of the +1 order will be reflected back towards the SLM at an angle −$\theta_1$ with respect to the normal. This order will be re-diffracted by the grating such that it propagates at an angle of 2$\theta_1$ to the normal, which, for small diffraction angles, corresponds to the angle of propagation of the m=+2 order of the original diffracted beam, $\theta_2$. Assuming a coverplate with refractive index of n=1.5, and no anti-refection coating, the Fresnel reflection coefficient of the front coverplate surface is approximately 4%. Let us assume an SLM which has 100% diffraction efficiency (no absorption losses and a perfect blazed grating). The power in the m=+1 and m=+2 directions will therefore be given by 0.96$P_{in}$ and 0.04$P_{in}$ respectively (ignoring multiple reflections). As a result, the theoretical crosstalk is −13.8 dB. This compares well to values of −14 to −18 dB measured experimentally. If we reduce the front face reflectivity to 1% (typical of single layer thin film coatings), the crosstalk reduces to approximately −20 dB. To reduce the crosstalk to <−40 dB the front face reflectivity should preferably be reduced to <0.01%. Such a low reflectivity is challenging, particularly as we should preferably ensure this value is maintained across the C-band, L-band, or C and L band. For example, the C-band extends from 1530 nm to 1570 nm, and L-band from 1565 nm to 1625 nm, and an optimized multi-layer coating can expensive to fabricate.

Figure 21:
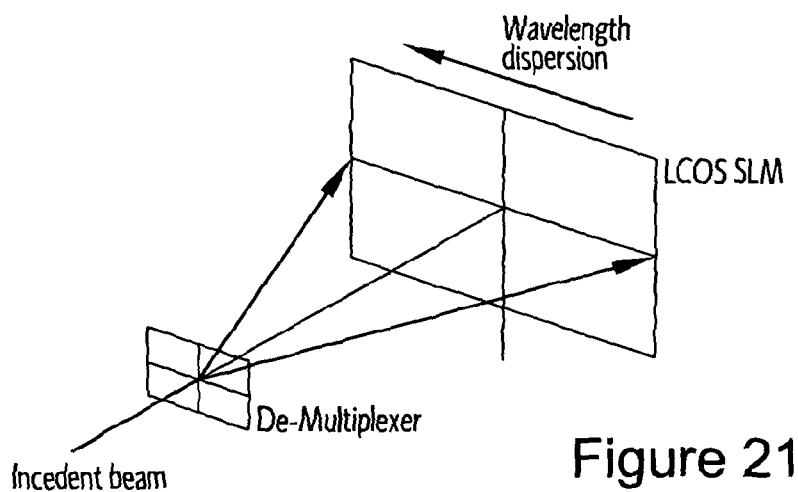
FIG. 21 shows an example of light being dispersed across the face of a LCOS SLM.
Figure 22:
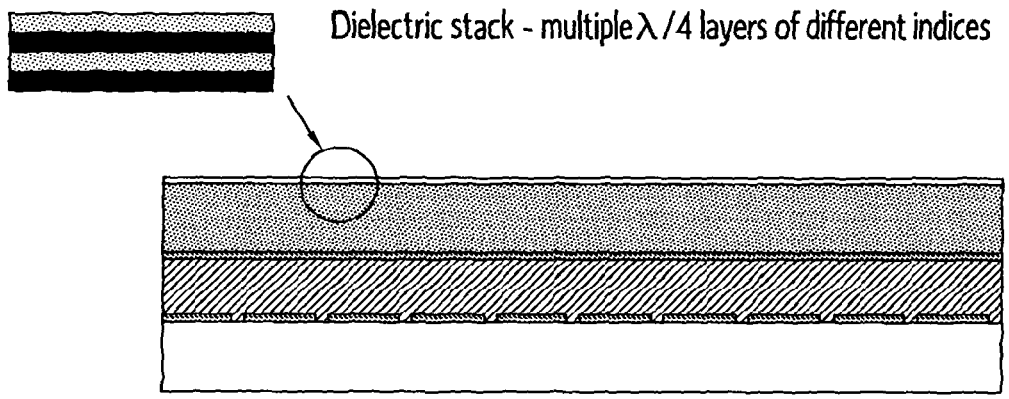
FIGS. 22a to 22c illustrate three potential coating schemes, showing (a) thin film dielectric layers, (b) a graded index layer, and (c) patterned microstructures.
Figure 22:
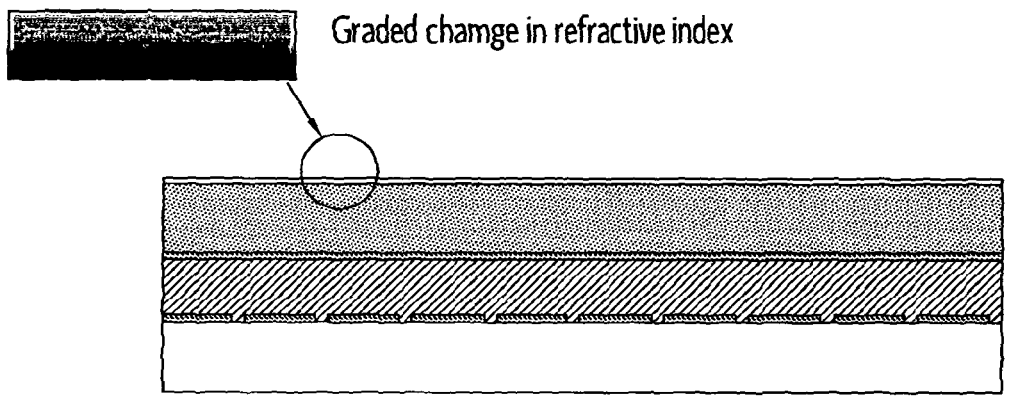
Figure 22:
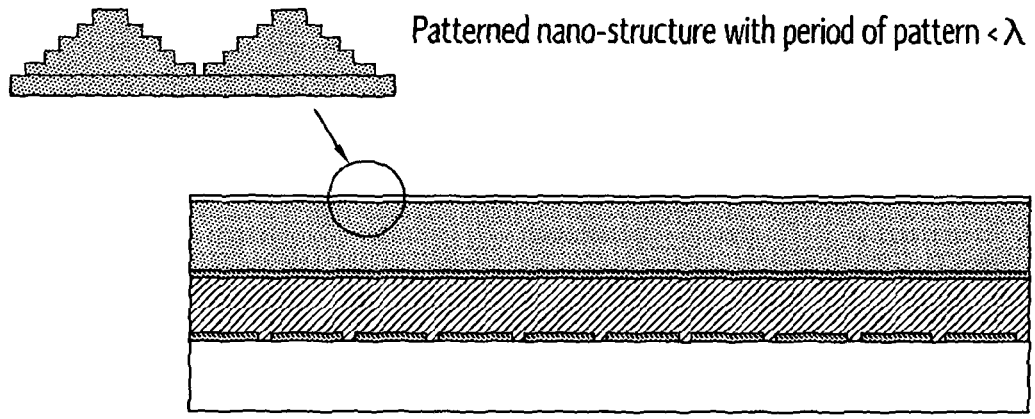

FIG. 21 shows the functional operation of a LCOS SLM used in conjunction with a wavelength de-multiplexer. Such a configuration may be used in wavelength selective switches, where separate sub-holograms deflect specific optical wavelengths, and in pulse shaping systems, where light is dispersed across the face of the SLM and each wavelength band is modified to produce the desired output pulse. Ideally we desire an anti-reflection coating that has continuously varying optical properties to match the incident wavelength.

Although particularly important for telecom applications, other applications that employ the optimization of complex hologram patterns also benefit from a reduction of front face reflectivity. The quality of the replay field in display holography and optical tweezers will improve as reducing $R_f$ ensures that the output wavefront more closely matches the designed wavefront.

It is desirable to provide an anti-reflection layer with the following properties:

a. Sufficient angular independence
b. Good polarization independence
c. Substantially no wavelength dependence over the desired operational bandwidth
d. Low temperature sensitivity
e. Is cheap and robust
f. Can be optimized across the surface of a coverplate to match operational wavelength range There are four potential techniques which may be employed for reducing crosstalk in practical LCOS SLM applications: geometric, thin film dielectric coatings, graded index coatings, and patterned nano-structures:

1) Geometrical—Rather than using a coverplate with parallel surfaces, we use a wedged coverplate that reflects light away from the main replay field. The applicability of this approach depends on the actual optical geometry, and may not be practical in some WSS (wavelength selective switch) architectures.

2) Thin film dielectric coatings—This technique for implementing anti-reflection coatings is illustrated in FIG. 4a. Typical C-band coatings available off-the-shelf can have a reflectivity <0.1%. To reduce $R_f$ to <0.01% on a complex substrate (ITO layer and optional alignment layers on the reverse side) could be done with an expensive custom coating run. However, as thin film coatings exhibit polarization dependence if used off-axis, it will be important to factor in the beam steering angles and alignment tolerances when designing the coating. Finally, the flexibility of thin film coatings is limited by the number of suitable deposition materials available (refractive indices), temperature stability, and suffer potential delamination problems if environmental conditions change.

3) Graded index coatings—This refers to a class of coatings that use an impendence matching layer with a graded change in refractive index as illustrated in FIG. 4b. By continuously increasing the refractive index from $n_{air}$ to $n_s$, where $n_s$ is the substrate refractive index, one can avoid sharp dielectric boundaries that cause Fresnel reflection. The profile can be, for example, parabolic or cubic, and can be implemented by varying the packing density of the films or by using inclined nano-rods.

Figure 23:
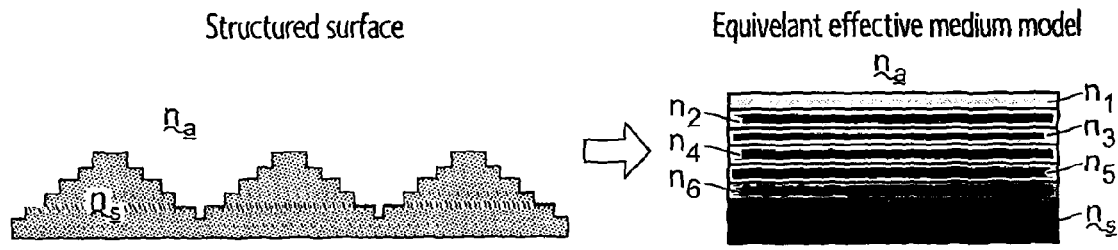
FIG. 23 shows an illustration of an effective medium representation of a structured anti-reflective surface.

4) Patterned nano-structures—This refers to a technique based on patterned nano-structured surfaces, an example of which is illustrated in FIG. 4c. The dimensions of nano-structures are <$\lambda$, so the incident light sees an average refractive index at a specific value of z that depends on the ratio of air and substrate. Thus there is an effective gradually change in refractive index through the patterned layer from $n_{air}$ to $n_s$. The structures can be designed and optimized using an effective medium theory (EMT) where the refractive index depends on the topology of the material. There are two main approaches for making such layers. The first is by imparting porosity to the film, with the porosity decreasing as we approach the substrate, for example by sol-gel processing. The second approach involves fabricating arrays of nano-structures that either suppress reflections by light trapping and multiple-internal reflections (surface texture) or by using an anti-reflection grating where the grating topology is engineered to ensure that only the m=0 order of the grating propagates, and that it produces a continuously varying refractive index. FIG. 23 illustrates this approach, with a patterned nano-structure with N=6, showing the structured surface on the left and a corresponding effective equivalent medium model on the right. The effective index of the six layers are set such that $n_{air}=n_a<n_1<n_2<n_3<n_4<n_5<n_6<n_s=n_{substrate}$.

Graded Index/Patterned Nano-structures for Telecoms Wavelengths

Raguin and Morris showed theoretically that a multi-level approximation to a pyramidal anti-reflection structure fabricated on a GaAs substrate (N=2, 4, and 8 phase-levels) and optimized for operation at 10.6 µm could have a reflectivity <3×10$^{-3}$% for all values of N for a randomly polarized normally incident beam (D. H. Raguin and G. M. Morris, "Antireflection structured surfaces for the intrared spectral region", Appl. Opt. 32, 1154-1166 (1993)). This exceeds the above target of 0.01%. Moreover, their model predicted a T=99.9% transmission when N=8 even if the wavelength range varied by 10.6 µm±10%, and the incident half angle varied by 30°.

Experimental results for graded index coating and patterned nano-structures have been presented for a variety of surface topologies, material systems, wavelengths and operating conditions (see the references in P. Lalanne and M. Hutley, "The optical properties of artificial media structured at a subwavelength scale"). Surface fabrication and replication techniques allow such surfaces to be fabricated for the visible. For example, Hutley and Gombert have used UV embossing into plastic using a nickel master to produce AR coated Fresnel lenses for overhead projectors (M. Hutley and A. Gombert, "Moth-eyes: the tortuous path from a glint in the eye to a commercial reality", Photonics Science News 6, 35-39 (2000)). Anti-reflection nano-structures may be produced for the optical C- and L-bands by similar techniques.

Referring again to FIG. 21, one can further vary the graded or nano-structured surface topology across the coverplate surface (varying pitch and/or shape, and the like), to thereby tailor the coating to match specific the wavelength at that section of the device. This is not possible using standard thin film deposition processes. In addition, a surface relief profile is more rugged than complex thin film dielectric stacks that can de-laminate—a potential problem during operation at elevated temperatures (telecom systems typically run at 60° C. to simplify temperature stabilization), and during LCOS SLM device fabrication.

Example Nanostructured Surfaces

Broadly speaking, the aim of using a nano-structured anti-reflection coating is to make a more effective broadband coating for telecoms, and one that can be tailored so that the reflectivity is <0.01% at each wavelength location across the SLM in a system that uses a wavelength de-multiplexer. This will allow simplification of the hologram design and optimization by reducing the front surface reflections (so they may be neglected), particularly coupled with the fact that blue phase SLMs do not require an alignment layer, thereby simplifying calculation and measurement of the coverplate/electrode/liquid crystal interface reflectivity.

For details of how to implement a wavelength-optimised coating reference may be made to A. Deinega, I. Valuev, B. Potapkin, and Y. Lozovik, "Minimizing light reflection from dielectric textured surfaces", J. Opt. Soc. Am. A, Vol. 28, No. 5, pp. 770-776, May 2011. In this paper simulations of the reflectivity from a variety of nano-structured surfaces are modelled using finite difference time domain analysis (FDTD). This technique gives a numerical solution to Maxwell's equations for complex surfaces by probing the structure with a plane wave in the form of a short pulse of light. As the pulse has a certain wavelength spread, on analysis of the reflected field the reflectivity as a function of wavelength can be derived. They model pyramidal surface relief structures which have a depth of d, a width of 2L and a period of $\Lambda$ over a full range of wavelengths on a glass substrate (n=1.5). We are interested in the long wavelength limit ($\Lambda<\lambda$) as this minimizes scattering losses as the light sees an effective graded index interface. For $\Lambda\sim\lambda$ and $\Lambda>\lambda$ we would get scattering and diffraction losses as the light would interact with effectively a periodic macro-prism structure on the surface of the SLM. This regime is considered in the paper, and in particular Deinega et al analyse square pyramids with linear, cubic and quantic profiles where $\Lambda=2L$. The two key results from this paper are in FIGS. 4 and 8. FIG. 4 shows that for a given $\lambda$, as we increase d, the depth of the structure, the reflectivity reduces (ratio of d/$\lambda$ increasing). This reduction depends on the pyramid profile (five different types analysed—linear pyramid, cubic profile, quantic profile, cones, and an ideal "integral" profile); our target is <0.01% or 10$^{-4}$. FIG. 8 shows the reflectance map as a function of ($\Lambda$/d) and (d/$\lambda$) for a square linear pyramidal structure.

As mentioned we are interested in the long wavelength region where $\lambda>\Lambda$ in order to minimize scattering. There are two ways to use this graph. Firstly for a varying nano-structure depth, d, and secondly for a fixed nano-structure depth. Let us assume that we have two discrete wavelengths, $\lambda_1$ and $\lambda_2$.

a. For a fixed value of d/$\Lambda$, if $\lambda_2<\lambda_1$, then $(\Lambda/\lambda_1)>(\Lambda/\lambda_2)$. Thus $R_1>R_2$. To reduce $R_1$, we increase d/$\Lambda$. As the graph tilts down as d/$\Lambda$ increases, $R_1$ decreases. Thus the pyramid depth for $\lambda_1$ should be greater than for $\lambda_2$ for the same reflectivity.

b. For a fixed value of d, let us consider points on the surface map that have the same reflectivity. The aim would be to choose the correct value for $\Lambda_1$ and $\Lambda_2$ that give the same values of $R_1$ and $R_2$ for given values of $\lambda_1$ and $\lambda_2$. For example, if $\Lambda_1>\Lambda_2$, then $(d/\Lambda_1)<(d/\Lambda_2)$, then we have two lines that run parallel to the (d/$\Lambda$) axis. We choose them for the given wavelengths, $\lambda_1$ and $\lambda_2$ so that $R_1=R_2$. This uses knowledge of the reflectivity map as both axes depend on $\Lambda$.

As blue phase liquid crystal based SLMs do not need alignment layers, this simplifies the suppression of crosstalk from the coverplate/ITO/liquid crystal surface as it is easier to calculate the theoretical reflectivity of this surface and, optionally, incorporate this in the hologram design.

Coverplate/Liquid Crystal Interface

We now consider the reflectivity due to the coverplate/liquid crystal (comprising glass, electrode (for example ITO—indium tin oxide), optional alignment layer, and liquid crystal layer(s)). This is more complicated because potentially four interfaces are present, and the alignment layer/liquid crystal layer reflectivity depends on the state of the liquid crystal. However, it is possible to 'tune out' the coverplate/liquid crystal reflectivity by employing a hologram pattern which sends an equal amount of power into the +2 order 180° out-of-phase with the power due to the coverplate/liquid crystal reflectivity. As the liquid crystal layer is very thin, temperature changes have negligible effect on the path length, so the reflection-cancellation hologram needs only be determined once. This approach is possible but not so easily implemented when dealing the coverplate front surface reflectivity, which is ~1 mm thick, as the same temperature change induces a larger optical path length change. To illustrate this, the optical path length change, $\Delta$opl, is given by $\Delta opl=nd\alpha\Delta T$, where n is the index, d is the material thickness, $\alpha$ is the coefficient of thermal expansion, and $\Delta T$ is the temperature change. Thus $\Delta$opl is proportional to ΔT, and maintaining the 180° out-of-phase condition becomes progressively harder as d increases.

Figure 24:
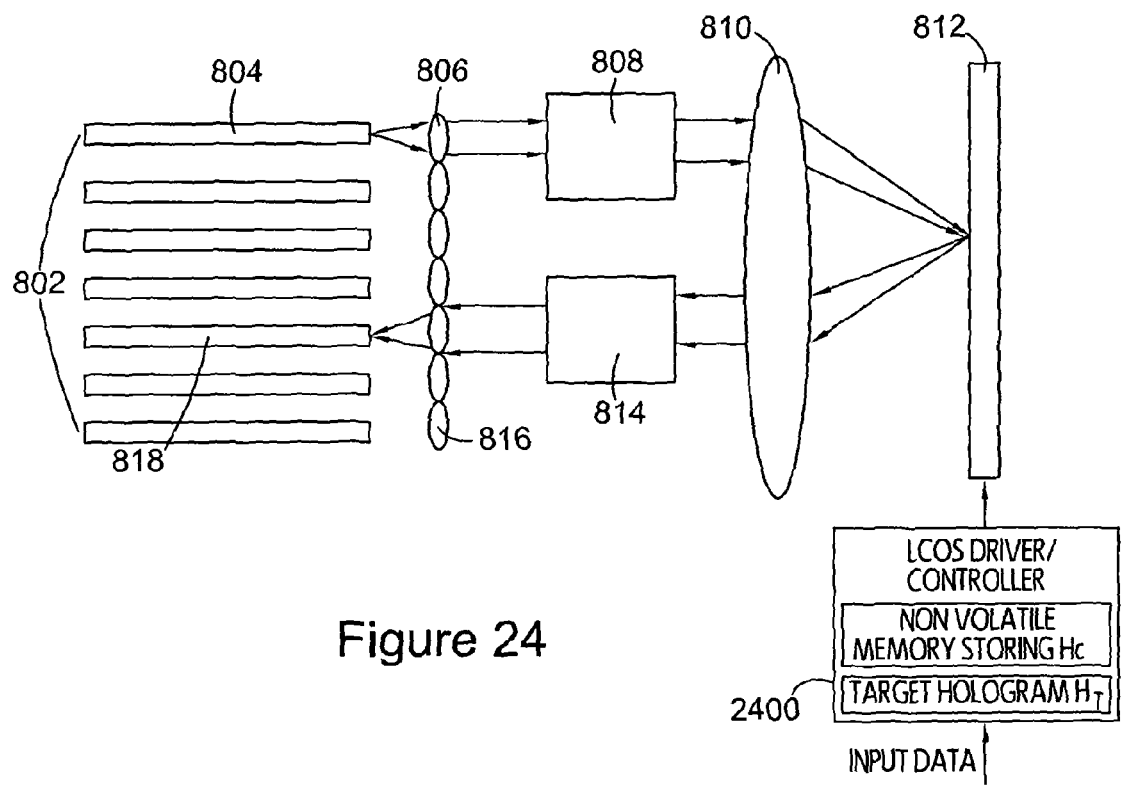
FIG. 24 shows a block diagram of an SLM controller/driver configured to drive an SLM with a reflection-compensation hologram.

FIG. 24 takes the system of FIG. 8 as an example (like elements are indicated by like reference numerals) and shows, in block diagram form, an SLM controller/driver 2400 configured to drive the LCOS SLM with such a reflection-compensation hologram. The input data to the controller/driver 2400 may comprise hologram data or higher level data such as beam switching/routing data (which may be converted into data defining a diffraction pattern for display on the SLM by, for example, a lookup table).

The reflection-compensation, $H_R$, hologram is computer generated, for example by any of a range of standard techniques (for example a Gerchberg-Saxton algorithm) and stored in non-volatile memory. This is then added to the target hologram $H_T$ to provide a combined hologram $H_C=H_R+H_T$ for display.

Figure 20:
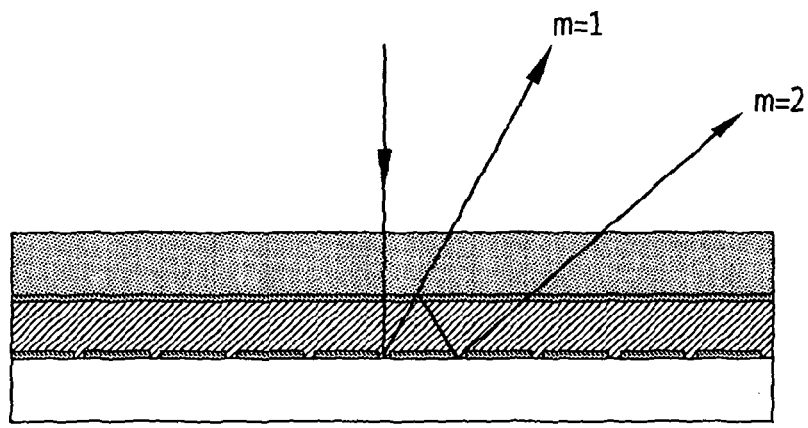
FIG. 20 shows an illustration of a problem with reflection from a front coverplate surface.

One way to compensate for the coverplate/ITO/alignment layer/liquid crystal interface reflectivity is, if the fundamental blazed grating has a period of T, to add a weak blazed grating (a compensating grating) of period 2T. This generates a +1 order beam that travels in the same direction as the +2 diffracted beam of the fundamental blazed grating (which also includes the unwanted reflected light as shown in FIG. 20) with the same field value. If we move this weak blazed grating sideways through a distance of 2T the phase of the +1 order from the compensating grating will continuously change from 0 to $2\pi$ due to the Fourier shift theorem. In this way it is possible adjust the phase of the compensating grating such that the +1 order from this grating is approximately in anti-phase with the unwanted reflected light. However, this is not a good approach in practice as the compensating grating intended to suppress the reflection itself may introduce new noise orders that could lead to crosstalk at other positions. A more preferable approach, particularly if one knows in advance the reflectivity of the coverplate/ITO/liquid crystal layer and the front coverplate reflectivity is minimized, is to globally optimize a hologram (for example along the lines described in WO2012/123713).

As previously mentioned, applying this cancellation technique to the front coverplate surface is more difficult due to the relative thickness of the coverplate. Temperature changes can cause the phase of the reflected beam to change with respect to the cancellation beam. However this may be compensated for by correcting the hologram for temperature, using a very thin coverplate, and/or by using a low thermal expansion coefficient glass.

We have described, in embodiments, a phase-only LCOS device employing liquid crystal in a blue phase. It will be understood that the invention is not limited to the described embodiments and encompasses modifications apparent to those skilled in the art lying within the spirit and scope of the claims appended hereto.

The invention claimed is:

1. A method of routing an optical signal, the method comprising:
    providing a routing device comprising a layer of blue phase liquid crystal between a plurality of separate, individually addressable electrodes and at least one counter electrode;
    applying a first spatial pattern of voltages between the separate, individually addressable electrodes and the at least one counter electrode such that the refractive index of the layer of blue phase liquid crystal varies spatially to provide a first diffraction grating that deflects the optical signal to a first output;
    applying a second spatial pattern of voltages between the separate, individually addressable electrodes and the at least one counter electrode such that the refractive index of the layer of blue phase liquid crystal varies spatially to provide a second diffraction grating that deflects the optical signal to a second output, thereby switching the optical signal from the first output to the second output;
    applying a square wave alternating voltage to the at least one counter electrode; and
    applying a spatial pattern of drive voltages to the separate, individually addressable electrodes,
    wherein the spatial pattern of drive voltages has a transition from a first set of drive voltages to a second set of drive voltages which coincides with a transition of the square wave alternating voltage and an instantaneous level of the square wave alternating voltage, at a first time, and said first set of drive voltages provide the first spatial pattern of voltages and an instantaneous level of the square wave alternating voltage, at a second time, and said second set of drive voltages provide the second spatial pattern of voltages.

2. The method of claim 1, wherein
    applying a first spatial pattern of voltages between the separate, individually addressable electrodes and the at least one counter electrode comprises applying a first drive signal to the separate, individually addressable electrodes, and
    applying a second spatial pattern of voltages between the separate, individually addressable electrodes and the at least one counter electrode comprises applying a second drive signal to the separate, individually addressable electrodes.

3. The method of claim 2, further comprising applying an electrical offset signal to the at least one counter electrode.

4. The method of claim 2, wherein the first drive signal and the second drive signals comprise a variable amplitude square wave.

5. The method of claim 4, further comprising applying a square wave alternating voltage to the at least one counter electrode.

6. The method of claim 5, wherein the first and second drive signals have transitions and wherein transitions of said square wave coincide with said transitions of the first and second drive signals.

7. A method of routing an optical signal, the method comprising:
    providing a reflective liquid crystal on a silicon (LCOS) backplane having a plurality of separate, individually addressable electrodes with a layer of blue-phase liquid crystal material over said backplane and a counter electrode over said blue-phase liquid crystal material; and
    displaying at least one diffractive optical element by applying a patterned electric field to said blue-phase liquid crystal material, wherein said electric field runs between said separate, individually addressable electrodes of said backplane and said counter electrode and substantially parallel to light incident onto and reflected from said reflective LCOS backplane; and
    deflecting a said signal optical signal using said diffractive optical element,
    wherein said displaying of said at least one diffractive optical element by applying a patterned electric field to said blue-phase liquid crystal material comprises displaying a hologram pattern on said diffractive optical element, the method comprising switching or routing a plurality of said signal beams simultaneously using said hologram pattern.

8. A method as claimed in claim 7, wherein said optical signal comprises a wavelength division multiplex (WDM) signal beam, the method further comprising de-multiplexing said WDM signal beam into a plurality of separate wavelength signal beams, wherein said de-multiplexing retains components of two orthogonal polarising components in a said separate wavelength signal beam;
directing said separate wavelength signal beams to different spatial regions of said diffractive optical element;
deflecting said separate wavelength signal beams; and
re-multiplexing at least some of said deflected separate wavelength signal beams.

9. A method of routing an optical signal, the method comprising:
providing a routing device comprising a layer of blue phase liquid crystal between a plurality of separate, individually addressable electrodes and at least one counter electrode;
applying a first spatial pattern of voltages between the separate, individually addressable electrodes and the at least one counter electrode such that the refractive index of the layer of blue phase liquid crystal varies spatially to provide a first diffraction grating that deflects the optical signal to a first output;
applying a second spatial pattern of voltages between the separate, individually addressable electrodes and the at least one counter electrode such that the refractive index of the layer of blue phase liquid crystal varies spatially to provide a second diffraction grating that deflects the optical signal to a second output, thereby switching the optical signal from the first output to the second output; and
applying an electrical offset signal to the at least one counter electrode.

10. The method of claim 9, wherein
applying a first spatial pattern of voltages between the separate, individually addressable electrodes and the at least one counter electrode comprises applying a first drive signal to the separate, individually addressable electrodes, and
applying a second spatial pattern of voltages between the separate, individually addressable electrodes and the at least one counter electrode comprises applying a second drive signal to the separate, individually addressable electrodes.

11. The method of claim 9, wherein the first drive signal and the second drive signals comprise a variable amplitude square wave.

12. The method of claim 11, further comprising applying a square wave alternating voltage to the at least one counter electrode.

13. The method of claim 12, wherein the first and second drive signals have transitions and wherein transitions of said square wave coincide with said transitions of the first and second drive signals.

14. A method of routing an optical signal, the method comprising:
providing a reflective liquid crystal on a silicon (LCOS) backplane having a plurality of separate, individually addressable electrodes with a layer of blue-phase liquid crystal material over said backplane and a counter electrode over said blue-phase liquid crystal material; and
displaying at least one diffractive optical element by applying a patterned electric field to said blue-phase liquid crystal material, wherein said electric field runs between said separate, individually addressable electrodes of said backplane and said counter electrode and substantially parallel to light incident onto and reflected from said reflective LCOS backplane; and
deflecting a said signal optical signal using said diffractive optical element,
wherein said optical signal comprises a wavelength division multiplex (WDM) signal beam, the method further comprising de-multiplexing said WDM signal beam into a plurality of separate wavelength signal beams, wherein said de-multiplexing retains components of two orthogonal polarising components in a said separate wavelength signal beam;
directing said separate wavelength signal beams to different spatial regions of said diffractive optical element;
deflecting said separate wavelength signal beams; and
re-multiplexing at least some of said deflected separate wavelength signal beams.

* * * * *